United States Patent
Cook et al.

(10) Patent No.: US 11,704,693 B2
(45) Date of Patent: *Jul. 18, 2023

(54) SYSTEM AND METHOD OF GENERATING EXISTING CUSTOMER LEADS

(71) Applicant: LMB MORTGAGE SERVICES, INC., Playa Vista, CA (US)

(72) Inventors: Bruce Cook, Venice, CA (US); Vincent Lewis, San Pedro, CA (US); Anson Lee, Los Angeles, CA (US)

(73) Assignee: LMB MORTGAGE SERVICES, INC., Playa Vista, CA (US)

(*) Notice: Subject to any disclaimer, the term of this patent is extended or adjusted under 35 U.S.C. 154(b) by 540 days.

This patent is subject to a terminal disclaimer.

(21) Appl. No.: 16/712,633

(22) Filed: Dec. 12, 2019

(65) Prior Publication Data

US 2020/0167822 A1 May 28, 2020

Related U.S. Application Data

(63) Continuation of application No. 16/440,671, filed on Jun. 13, 2019, now Pat. No. 10,565,617, which is a
(Continued)

(51) Int. Cl.
*G06Q 30/0251* (2023.01)
*G06Q 30/0601* (2023.01)
*G06Q 40/03* (2023.01)

(52) U.S. Cl.
CPC ..... *G06Q 30/0255* (2013.01); *G06Q 30/0251* (2013.01); *G06Q 30/0609* (2013.01); *G06Q 40/03* (2023.01)

(58) Field of Classification Search
CPC ........... G06Q 30/0255; G06Q 30/0609; G06Q 40/025
See application file for complete search history.

(56) References Cited

U.S. PATENT DOCUMENTS

| 4,982,346 A | 1/1991 | Girouard et al. |
| 5,056,019 A | 10/1991 | Schultz et al. |

(Continued)

FOREIGN PATENT DOCUMENTS

| GB | 2 384 087 | 7/2003 |
| GB | 2 392 748 | 3/2004 |

(Continued)

OTHER PUBLICATIONS

"Anchor Launches LeadVerifier to Verify, Correct and Enhance Internet Leads", PR Web: Press Release Newsire, Farmingdale, NY, Aug. 8, 2005, pp. 2.

(Continued)

*Primary Examiner* — Renae Feacher
(74) *Attorney, Agent, or Firm* — Knobbe, Martens, Olson & Bear, LLP

(57) ABSTRACT

One embodiment of an existing customer lead generation system comprises a vendor customer information database, a vendor criteria database, a web server, a matching engine, and a transmission component. The vendor customer information database identifies vendor's existing customers. The vendor criteria database determines which leads each vendor wants to receive. Separate criteria may be specified for consumers that are existing customers and consumers that are not existing customers. The web server receives characteristics of a consumer and a product or service. The matching engine compares the consumer characteristics with the vendor customer information database to identify vendors for which the consumer is an existing customer. The matching engine applies existing customer criteria to match the consumer with existing vendors. The matching engine applies non-existing customer criteria to match the consumer with other vendors. The transmission component (Continued)

transmits a lead identifying the consumer to the matched vendors.

20 Claims, 6 Drawing Sheets

Related U.S. Application Data continuation of application No. 14/819,344, filed on Aug. 5, 2015, now Pat. No. 10,373,198, which is a continuation of application No. 12/139,285, filed on Jun. 13, 2008, now abandoned.

(56) References Cited

U.S. PATENT DOCUMENTS

| | | | |
|---|---|---|---|
| 5,353,218 A | 10/1994 | DeLapa et al. | |
| 5,454,030 A | 9/1995 | de Oliveira et al. | |
| 5,459,306 A | 10/1995 | Stein et al. | |
| 5,504,675 A | 4/1996 | Cragun et al. | |
| 5,521,813 A | 5/1996 | Fox et al. | |
| 5,583,763 A | 12/1996 | Atcheson et al. | |
| 5,621,812 A | 4/1997 | Deaton et al. | |
| 5,628,004 A | 5/1997 | Gormley et al. | |
| 5,649,114 A | 7/1997 | Deaton et al. | |
| 5,692,107 A | 11/1997 | Simoudis et al. | |
| 5,696,907 A | 12/1997 | Tom | |
| 5,745,654 A | 4/1998 | Titan | |
| 5,774,868 A | 6/1998 | Cragun et al. | |
| 5,774,870 A | 6/1998 | Storey | |
| 5,794,210 A | 8/1998 | Goldhaber et al. | |
| 5,802,142 A | 9/1998 | Browne | |
| 5,819,226 A | 10/1998 | Gopinathan et al. | |
| 5,819,291 A | 10/1998 | Haimowitz et al. | |
| 5,842,178 A | 11/1998 | Giovannoli | |
| 5,857,175 A | 1/1999 | Day et al. | |
| 5,864,822 A | 1/1999 | Baker, III | |
| 5,878,403 A | 3/1999 | DeFrancesco et al. | |
| 5,884,287 A | 3/1999 | Edesess | |
| 5,884,289 A | 3/1999 | Anderson et al. | |
| 5,926,800 A | 7/1999 | Baranowski et al. | |
| 5,930,764 A | 7/1999 | Melchione et al. | |
| 5,933,813 A | 8/1999 | Teicher et al. | |
| 5,953,707 A | 9/1999 | Huang et al. | |
| 6,009,415 A | 12/1999 | Shurling et al. | |
| 6,029,139 A | 2/2000 | Cunningham et al. | |
| 6,029,149 A | 2/2000 | Dykstra et al. | |
| 6,029,154 A | 2/2000 | Pettitt | |
| 6,067,525 A | 5/2000 | Johnson et al. | |
| 6,078,892 A | 6/2000 | Anderson et al. | |
| 6,094,643 A | 7/2000 | Anderson et al. | |
| 6,119,103 A | 9/2000 | Basch et al. | |
| 6,208,979 B1 | 3/2001 | Sinclair | |
| 6,233,566 B1 | 5/2001 | Levine | |
| 6,254,000 B1 | 7/2001 | Degen et al. | |
| 6,269,325 B1 | 7/2001 | Lee et al. | |
| 6,282,517 B1 | 8/2001 | Wolfe et al. | |
| 6,321,205 B1 | 11/2001 | Eder | |
| 6,324,524 B1 | 11/2001 | Lent et al. | |
| 6,330,546 B1 | 12/2001 | Gopinathan et al. | |
| 6,385,594 B1 | 5/2002 | Lebda et al. | |
| 6,393,406 B1 | 5/2002 | Eder | |
| 6,418,436 B1 | 7/2002 | Degen et al. | |
| 6,430,539 B1 | 8/2002 | Lazarus et al. | |
| 6,448,898 B1 | 9/2002 | Kasik | |
| 6,513,018 B1 | 1/2003 | Culhane | |
| 6,529,878 B2 | 3/2003 | De Rafael et al. | |
| 6,542,894 B1 | 4/2003 | Lee et al. | |
| 6,597,775 B2 | 7/2003 | Lawyer et al. | |
| 6,611,816 B2 | 8/2003 | Lebda et al. | |
| 6,615,193 B1 | 9/2003 | Kingdon et al. | |
| 6,714,918 B2 | 3/2004 | Hillmer et al. | |
| 6,782,390 B2 | 8/2004 | Lee et al. | |
| 6,823,319 B1 | 11/2004 | Lynch et al. | |
| 6,839,682 B1 | 1/2005 | Blume et al. | |
| 6,850,606 B2 | 2/2005 | Lawyer et al. | |
| 6,868,389 B1 | 3/2005 | Wilkins et al. | |
| 6,873,979 B2 | 3/2005 | Fishman et al. | |
| 6,901,406 B2 | 5/2005 | Nabe et al. | |
| 6,925,441 B1 | 8/2005 | Jones, III et al. | |
| 6,938,022 B1 * | 8/2005 | Singhal | G06Q 30/06 705/78 |
| 7,006,614 B2 | 2/2006 | Feinberg et al. | |
| 7,028,052 B2 | 4/2006 | Chapman et al. | |
| 7,035,699 B1 | 4/2006 | Anderson et al. | |
| 7,043,531 B1 | 5/2006 | Seibel et al. | |
| 7,047,251 B2 | 5/2006 | Reed et al. | |
| 7,096,205 B2 | 8/2006 | Hansen et al. | |
| 7,096,220 B1 | 8/2006 | Seibel et al. | |
| 7,136,448 B1 | 11/2006 | Venkataperumal et al. | |
| 7,139,732 B1 | 11/2006 | Desenberg | |
| 7,212,995 B2 | 5/2007 | Schukins | |
| 7,228,284 B1 | 6/2007 | Vaillancourt et al. | |
| 7,234,156 B2 | 6/2007 | French et al. | |
| 7,263,506 B2 | 8/2007 | Lee et al. | |
| 7,277,875 B2 | 10/2007 | Serrano-Morales et al. | |
| 7,283,974 B2 | 10/2007 | Katz et al. | |
| 7,296,734 B2 | 11/2007 | Pliha | |
| 7,305,364 B2 | 12/2007 | Nabe et al. | |
| 7,314,167 B1 | 1/2008 | Kiliccote | |
| 7,333,976 B1 | 2/2008 | Auerbach et al. | |
| 7,340,410 B1 | 3/2008 | Vaillancourt et al. | |
| 7,343,149 B2 | 3/2008 | Benco | |
| 7,379,913 B2 | 5/2008 | Steele et al. | |
| 7,383,215 B1 | 6/2008 | Navarro et al. | |
| 7,428,509 B2 | 9/2008 | Klebanoff | |
| 7,433,855 B2 | 10/2008 | Gavan et al. | |
| 7,458,508 B1 | 12/2008 | Shao et al. | |
| 7,509,117 B2 | 3/2009 | Yum | |
| 7,512,221 B2 | 3/2009 | Toms | |
| 7,542,993 B2 | 6/2009 | Satterfield et al. | |
| 7,546,243 B2 | 6/2009 | Kapadia et al. | |
| 7,548,886 B2 | 6/2009 | Kirkland et al. | |
| 7,556,192 B2 | 7/2009 | Wokaty, Jr. | |
| 7,562,184 B2 | 7/2009 | Henmi et al. | |
| 7,562,814 B1 | 7/2009 | Shao | |
| 7,575,157 B2 | 8/2009 | Barnhardt et al. | |
| 7,581,112 B2 | 8/2009 | Brown et al. | |
| 7,610,216 B1 | 10/2009 | May et al. | |
| 7,620,596 B2 | 11/2009 | Knudson et al. | |
| 7,623,844 B2 | 11/2009 | Herrmann et al. | |
| 7,630,933 B2 | 12/2009 | Peterson et al. | |
| 7,657,569 B1 | 2/2010 | Semprevivo et al. | |
| 7,664,668 B2 | 2/2010 | Lissy et al. | |
| 7,668,725 B2 | 2/2010 | Alston | |
| 7,668,769 B2 | 2/2010 | Baker et al. | |
| 7,672,865 B2 | 3/2010 | Kumar et al. | |
| 7,686,214 B1 | 3/2010 | Shao et al. | |
| 7,690,032 B1 | 3/2010 | Peirce | |
| 7,708,190 B2 | 5/2010 | Brandt et al. | |
| 7,725,300 B2 | 5/2010 | Pinto et al. | |
| 7,752,054 B1 | 7/2010 | Anthony-Hoppe et al. | |
| 7,752,236 B2 | 7/2010 | Williams et al. | |
| 7,761,384 B2 | 7/2010 | Madhogarhia | |
| 7,778,885 B1 * | 8/2010 | Semprevivo | G06Q 30/02 705/26.1 |
| 7,788,147 B2 | 8/2010 | Haggerty et al. | |
| 7,788,152 B2 | 8/2010 | Haggerty et al. | |
| 7,793,835 B1 | 9/2010 | Coggeshall et al. | |
| 7,801,811 B1 | 9/2010 | Merrell et al. | |
| 7,801,843 B2 | 9/2010 | Kumar et al. | |
| 7,802,104 B2 | 9/2010 | Dickinson | |
| 7,805,362 B1 | 9/2010 | Merrell et al. | |
| 7,827,115 B2 | 11/2010 | Weller et al. | |
| 7,856,494 B2 | 12/2010 | Kulkarni | |
| 7,912,770 B2 | 3/2011 | Haggerty et al. | |
| 7,954,698 B1 | 6/2011 | Pliha | |
| 7,962,347 B2 | 6/2011 | Anthony-Hoppe et al. | |
| 7,962,501 B1 | 6/2011 | Semprevivo et al. | |
| 7,970,672 B2 | 6/2011 | Mendelevich et al. | |
| 7,970,690 B2 | 6/2011 | Diana et al. | |
| 7,991,689 B1 | 8/2011 | Brunzell et al. | |
| 8,060,424 B2 | 11/2011 | Kasower | |
| 8,135,607 B2 | 3/2012 | Williams et al. | |

(56) References Cited

U.S. PATENT DOCUMENTS

| | | |
|---|---|---|
| 8,175,966 B2 | 5/2012 | Steinberg et al. |
| 8,214,262 B1 | 7/2012 | Semprevivo et al. |
| 8,271,313 B2 | 9/2012 | Williams et al. |
| 8,285,656 B1 | 10/2012 | Chang et al. |
| 8,346,658 B1 | 1/2013 | Curry et al. |
| 8,533,002 B2 | 9/2013 | Mesaros |
| 8,533,038 B2 | 9/2013 | Bergh et al. |
| 8,566,141 B1 | 10/2013 | Nagdev et al. |
| 8,606,626 B1 | 12/2013 | DeSoto |
| 8,688,724 B1 | 4/2014 | Semprevivo et al. |
| 9,110,916 B1 | 8/2015 | Semprevivo et al. |
| 9,665,885 B1 | 5/2017 | Allouche |
| 10,204,141 B1 | 2/2019 | Semprevivo et al. |
| 10,255,610 B1 | 4/2019 | Semprevivo et al. |
| 10,373,198 B1 | 8/2019 | Cook et al. |
| 10,453,093 B1 | 10/2019 | Leteux et al. |
| 10,565,617 B2 | 2/2020 | Cook et al. |
| 10,977,675 B2 | 4/2021 | Semprevivo et al. |
| 11,106,677 B2 | 8/2021 | Semprevivo et al. |
| 11,430,009 B2 | 8/2022 | Leteux et al. |
| 2001/0014868 A1 | 8/2001 | Herz et al. |
| 2001/0035972 A1 | 11/2001 | Wurmfeld |
| 2001/0047289 A1 | 11/2001 | Mckee et al. |
| 2002/0007343 A1 | 1/2002 | Oyama et al. |
| 2002/0035504 A1 | 3/2002 | Dver et al. |
| 2002/0035568 A1 | 3/2002 | Benthin et al. |
| 2002/0038312 A1 | 3/2002 | Donner et al. |
| 2002/0059095 A1 | 5/2002 | Cook |
| 2002/0072975 A1* | 6/2002 | Steele ............... G06Q 30/0269 |
| | | 705/14.1 |
| 2002/0077964 A1 | 6/2002 | Brody et al. |
| 2002/0077998 A1 | 6/2002 | Andrews et al. |
| 2002/0082892 A1 | 6/2002 | Reffel et al. |
| 2002/0087460 A1 | 7/2002 | Hornung |
| 2002/0099649 A1 | 7/2002 | Lee et al. |
| 2002/0128960 A1 | 9/2002 | Lambiotte et al. |
| 2002/0136381 A1 | 9/2002 | Shaffer et al. |
| 2002/0143620 A1 | 10/2002 | Kraus |
| 2002/0147695 A1 | 10/2002 | Khedkar et al. |
| 2002/0161711 A1 | 10/2002 | Sartor et al. |
| 2002/0188511 A1 | 12/2002 | Johnson et al. |
| 2002/0194050 A1 | 12/2002 | Nabe et al. |
| 2003/0009426 A1 | 1/2003 | Ruiz-Sanchez |
| 2003/0018613 A1* | 1/2003 | Oytac .................... G06Q 30/02 |
| 2003/0050882 A1 | 3/2003 | Degen et al. |
| 2003/0061163 A1 | 3/2003 | Durfield |
| 2003/0065563 A1 | 4/2003 | Elliott et al. |
| 2003/0065620 A1* | 4/2003 | Gailey ...................... H04L 9/40 |
| | | 705/51 |
| 2003/0078877 A1 | 4/2003 | Beirne et al. |
| 2003/0097320 A1 | 5/2003 | Gordon |
| 2003/0097329 A1 | 5/2003 | Nabe et al. |
| 2003/0115133 A1 | 6/2003 | Bian |
| 2003/0158751 A1 | 8/2003 | Suresh et al. |
| 2003/0163363 A1 | 8/2003 | Pratte et al. |
| 2003/0172002 A1 | 9/2003 | Spira et al. |
| 2003/0182214 A1 | 9/2003 | Taylor |
| 2003/0195830 A1 | 10/2003 | Merkoulovitch |
| 2003/0195859 A1 | 10/2003 | Lawrence |
| 2003/0212618 A1 | 11/2003 | Keyes et al. |
| 2003/0217003 A1 | 11/2003 | Weinflash et al. |
| 2003/0220858 A1 | 11/2003 | Lam et al. |
| 2003/0225692 A1 | 12/2003 | Bosch et al. |
| 2003/0229504 A1 | 12/2003 | Hollister |
| 2004/0030667 A1 | 2/2004 | Xu et al. |
| 2004/0039686 A1 | 2/2004 | Klebanoff |
| 2004/0044615 A1 | 3/2004 | Xue et al. |
| 2004/0044617 A1 | 3/2004 | Lu |
| 2004/0052357 A1 | 3/2004 | Logan et al. |
| 2004/0054619 A1 | 3/2004 | Watson et al. |
| 2004/0064401 A1 | 4/2004 | Palaghita et al. |
| 2004/0064402 A1* | 4/2004 | Dreyer .................. G06Q 40/03 |
| | | 705/38 |
| 2004/0078323 A1 | 4/2004 | Johnston et al. |
| 2004/0100964 A1 | 5/2004 | Robotham et al. |
| 2004/0107132 A1 | 6/2004 | Honarvar et al. |
| 2004/0111305 A1 | 6/2004 | Gavan et al. |
| 2004/0111312 A1 | 6/2004 | Ingman et al. |
| 2004/0111363 A1 | 6/2004 | Trench et al. |
| 2004/0117235 A1 | 6/2004 | Shacham |
| 2004/0122730 A1 | 6/2004 | Tucciarone et al. |
| 2004/0143482 A1 | 7/2004 | Tivey et al. |
| 2004/0143483 A1 | 7/2004 | Tivey et al. |
| 2004/0167793 A1 | 8/2004 | Masuoka et al. |
| 2004/0177030 A1 | 9/2004 | Shoham |
| 2004/0177046 A1 | 9/2004 | Ogram |
| 2004/0193535 A1 | 9/2004 | Barazesh |
| 2004/0199462 A1 | 10/2004 | Starrs |
| 2004/0205080 A1 | 10/2004 | Patel |
| 2004/0205157 A1 | 10/2004 | Bibelnieks et al. |
| 2004/0230448 A1 | 11/2004 | Schaich |
| 2004/0230527 A1 | 11/2004 | Hansen et al. |
| 2004/0243518 A1 | 12/2004 | Clifton et al. |
| 2005/0021476 A1 | 1/2005 | Candella et al. |
| 2005/0027632 A1 | 2/2005 | Zeitoun et al. |
| 2005/0027983 A1 | 2/2005 | Klawon |
| 2005/0038688 A1 | 2/2005 | Collins et al. |
| 2005/0044036 A1 | 2/2005 | Harrington et al. |
| 2005/0058262 A1 | 3/2005 | Timmins et al. |
| 2005/0065809 A1 | 3/2005 | Henze |
| 2005/0065874 A1 | 3/2005 | Lefner et al. |
| 2005/0075987 A1 | 4/2005 | Pintsov et al. |
| 2005/0080821 A1 | 4/2005 | Breil et al. |
| 2005/0097051 A1 | 5/2005 | Madill, Jr. et al. |
| 2005/0102226 A1 | 5/2005 | Oppenheimer et al. |
| 2005/0108041 A1 | 5/2005 | White |
| 2005/0125350 A1 | 6/2005 | Tidwell et al. |
| 2005/0130704 A1 | 6/2005 | McParland et al. |
| 2005/0131760 A1 | 6/2005 | Manning et al. |
| 2005/0144067 A1 | 6/2005 | Farahat et al. |
| 2005/0154648 A1 | 7/2005 | Strause |
| 2005/0154664 A1 | 7/2005 | Guy et al. |
| 2005/0154665 A1 | 7/2005 | Kerr |
| 2005/0171859 A1 | 8/2005 | Harrington et al. |
| 2005/0182774 A1 | 8/2005 | Weir et al. |
| 2005/0187860 A1 | 8/2005 | Peterson et al. |
| 2005/0209922 A1 | 9/2005 | Hofmeister |
| 2005/0222906 A1 | 10/2005 | Chen |
| 2005/0256809 A1 | 11/2005 | Sadri |
| 2005/0267812 A1 | 12/2005 | Jensen et al. |
| 2005/0273442 A1 | 12/2005 | Bennett et al. |
| 2005/0278246 A1 | 12/2005 | Friedman et al. |
| 2005/0278542 A1 | 12/2005 | Pierson et al. |
| 2005/0279824 A1 | 12/2005 | Anderson et al. |
| 2006/0004731 A1 | 1/2006 | Seibel et al. |
| 2006/0041464 A1 | 2/2006 | Powers et al. |
| 2006/0041500 A1 | 2/2006 | Diana et al. |
| 2006/0059073 A1 | 3/2006 | Walzak |
| 2006/0059110 A1 | 3/2006 | Madhok et al. |
| 2006/0064340 A1 | 3/2006 | Cook |
| 2006/0074986 A1 | 4/2006 | Mallalieu et al. |
| 2006/0080230 A1 | 4/2006 | Freiberg |
| 2006/0080263 A1 | 4/2006 | Willis et al. |
| 2006/0100944 A1 | 5/2006 | Reddin et al. |
| 2006/0106668 A1 | 5/2006 | Kim et al. |
| 2006/0129422 A1 | 6/2006 | Kim et al. |
| 2006/0129428 A1 | 6/2006 | Wennberg |
| 2006/0129481 A1 | 6/2006 | Bhatt et al. |
| 2006/0131390 A1 | 6/2006 | Kim |
| 2006/0143695 A1 | 6/2006 | Grynberg |
| 2006/0161435 A1 | 7/2006 | Atef et al. |
| 2006/0173776 A1 | 8/2006 | Shalley et al. |
| 2006/0178971 A1 | 8/2006 | Owen et al. |
| 2006/0184381 A1 | 8/2006 | Rice et al. |
| 2006/0184417 A1 | 8/2006 | Van der Linden et al. |
| 2006/0200396 A1 | 9/2006 | Satterfield et al. |
| 2006/0204051 A1 | 9/2006 | Holland, IV |
| 2006/0229961 A1 | 10/2006 | Lyftogt et al. |
| 2006/0239512 A1 | 10/2006 | Petrillo |
| 2006/0242000 A1 | 10/2006 | Giguiere |
| 2006/0242046 A1 | 10/2006 | Haggerty et al. |
| 2006/0253358 A1 | 11/2006 | Delgrosso et al. |
| 2006/0262929 A1 | 11/2006 | Vatanen et al. |
| 2006/0265243 A1 | 11/2006 | Racho et al. |

(56) References Cited

U.S. PATENT DOCUMENTS

| | | |
|---|---|---|
| 2006/0265259 A1 | 11/2006 | Diana et al. |
| 2006/0271456 A1 | 11/2006 | Romain et al. |
| 2006/0271457 A1 | 11/2006 | Romain et al. |
| 2007/0005508 A1 | 1/2007 | Chiang |
| 2007/0016522 A1 | 1/2007 | Wang |
| 2007/0033227 A1 | 2/2007 | Gaito et al. |
| 2007/0038483 A1 | 2/2007 | Wood |
| 2007/0038516 A1 | 2/2007 | Apple et al. |
| 2007/0059442 A1 | 3/2007 | Sabeta |
| 2007/0067234 A1 | 3/2007 | Beech et al. |
| 2007/0067297 A1 | 3/2007 | Kublickis |
| 2007/0072190 A1 | 3/2007 | Aggarwal |
| 2007/0078985 A1 | 4/2007 | Shao et al. |
| 2007/0083460 A1 | 4/2007 | Bachenheimer |
| 2007/0093234 A1 | 4/2007 | Willis et al. |
| 2007/0094137 A1 | 4/2007 | Phillips et al. |
| 2007/0106582 A1 | 5/2007 | Baker et al. |
| 2007/0112582 A1 | 5/2007 | Fenlon |
| 2007/0112667 A1 | 5/2007 | Rucker |
| 2007/0118435 A1 | 5/2007 | Ran |
| 2007/0150372 A1 | 6/2007 | Schoenberg |
| 2007/0192248 A1 | 8/2007 | West |
| 2007/0205266 A1 | 9/2007 | Carr et al. |
| 2007/0214076 A1 | 9/2007 | Robida et al. |
| 2007/0220003 A1 | 9/2007 | Chern et al. |
| 2007/0226093 A1 | 9/2007 | Chan et al. |
| 2007/0233559 A1 | 10/2007 | Golec |
| 2007/0233561 A1 | 10/2007 | Golec |
| 2007/0239721 A1 | 10/2007 | Ullman et al. |
| 2007/0244807 A1 | 10/2007 | Andringa et al. |
| 2007/0288355 A1 | 12/2007 | Roland et al. |
| 2007/0288559 A1 | 12/2007 | Parsadayan |
| 2007/0299609 A1 | 12/2007 | Garin et al. |
| 2007/0299771 A1 | 12/2007 | Brody et al. |
| 2008/0005106 A1* | 1/2008 | Schumacher ..... G06F 16/24556 |
| 2008/0010687 A1 | 1/2008 | Gonen et al. |
| 2008/0015887 A1 | 1/2008 | Drabek et al. |
| 2008/0033869 A1 | 2/2008 | Steele et al. |
| 2008/0066188 A1 | 3/2008 | Kwak |
| 2008/0077526 A1 | 3/2008 | Arumugam |
| 2008/0091535 A1 | 4/2008 | Heiser et al. |
| 2008/0103800 A1 | 5/2008 | Domenikos et al. |
| 2008/0103960 A1 | 5/2008 | Sweeney |
| 2008/0103972 A1 | 5/2008 | Lanc |
| 2008/0109444 A1 | 5/2008 | Williams et al. |
| 2008/0109445 A1 | 5/2008 | Williams et al. |
| 2008/0120155 A1 | 5/2008 | Pliha |
| 2008/0126233 A1 | 5/2008 | Hogan |
| 2008/0147454 A1 | 6/2008 | Walker et al. |
| 2008/0167883 A1 | 7/2008 | Khazaneh |
| 2008/0175360 A1 | 7/2008 | Schwarz et al. |
| 2008/0255992 A1 | 10/2008 | Lin |
| 2008/0270292 A1 | 10/2008 | Ghosh et al. |
| 2008/0275916 A1 | 11/2008 | Bohannon |
| 2008/0281737 A1 | 11/2008 | Fajardo |
| 2008/0281756 A1 | 11/2008 | Riise et al. |
| 2008/0288361 A1 | 11/2008 | Rego et al. |
| 2008/0288382 A1 | 11/2008 | Smith et al. |
| 2008/0294540 A1 | 11/2008 | Celka et al. |
| 2008/0300962 A1 | 12/2008 | Cawston et al. |
| 2009/0044279 A1 | 2/2009 | Crawford et al. |
| 2009/0106150 A1 | 4/2009 | Pelegero et al. |
| 2009/0106846 A1 | 4/2009 | Dupray et al. |
| 2009/0125369 A1 | 5/2009 | Kloostra et al. |
| 2009/0126013 A1 | 5/2009 | Atwood et al. |
| 2009/0144160 A1 | 6/2009 | Haggerty et al. |
| 2009/0144185 A1 | 6/2009 | Haggerty et al. |
| 2009/0165098 A1* | 6/2009 | Ifrah ..................... G06Q 20/02 705/317 |
| 2009/0182653 A1 | 7/2009 | Zimiles |
| 2009/0199264 A1 | 8/2009 | Lang |
| 2009/0222308 A1 | 9/2009 | Zoldi et al. |
| 2009/0222373 A1 | 9/2009 | Choudhuri et al. |
| 2009/0222374 A1 | 9/2009 | Choudhuri et al. |
| 2009/0222375 A1 | 9/2009 | Choudhuri et al. |
| 2009/0222376 A1 | 9/2009 | Choudhuri et al. |
| 2009/0222377 A1 | 9/2009 | Choudhuri et al. |
| 2009/0222378 A1 | 9/2009 | Choudhuri et al. |
| 2009/0222379 A1 | 9/2009 | Choudhuri et al. |
| 2009/0222380 A1 | 9/2009 | Choudhuri et al. |
| 2009/0228339 A1 | 9/2009 | Wolf |
| 2009/0248567 A1 | 10/2009 | Haggerty et al. |
| 2009/0248568 A1 | 10/2009 | Haggerty et al. |
| 2009/0248569 A1 | 10/2009 | Haggerty et al. |
| 2009/0248570 A1 | 10/2009 | Haggerty et al. |
| 2009/0248571 A1 | 10/2009 | Haggerty et al. |
| 2009/0248572 A1 | 10/2009 | Haggerty et al. |
| 2009/0248573 A1 | 10/2009 | Haggerty et al. |
| 2009/0254476 A1 | 10/2009 | Sharma et al. |
| 2009/0254971 A1* | 10/2009 | Herz ................. G06Q 30/0603 726/1 |
| 2009/0307104 A1 | 12/2009 | Weng |
| 2010/0023447 A1 | 1/2010 | Mac Innis |
| 2010/0043055 A1 | 2/2010 | Baumgart |
| 2010/0094768 A1 | 4/2010 | Miltonberger |
| 2010/0100945 A1 | 4/2010 | Ozzie et al. |
| 2010/0114744 A1 | 5/2010 | Gonen |
| 2010/0121767 A1 | 5/2010 | Coulter et al. |
| 2010/0130172 A1 | 5/2010 | Vendrow et al. |
| 2010/0145836 A1 | 6/2010 | Baker et al. |
| 2010/0205662 A1 | 8/2010 | Ibrahim et al. |
| 2010/0229245 A1 | 9/2010 | Singhal |
| 2010/0234708 A1 | 9/2010 | Buck et al. |
| 2010/0250364 A1 | 9/2010 | Song et al. |
| 2011/0004498 A1 | 1/2011 | Readshaw |
| 2011/0016042 A1 | 1/2011 | Cho et al. |
| 2011/0047071 A1 | 2/2011 | Choudhuri et al. |
| 2011/0093383 A1 | 4/2011 | Haggerty et al. |
| 2011/0112958 A1 | 5/2011 | Haggerty et al. |
| 2011/0137730 A1 | 6/2011 | McCarney et al. |
| 2011/0238477 A1 | 9/2011 | Urbanski |
| 2012/0197762 A1 | 8/2012 | Steinberg et al. |
| 2013/0245472 A1 | 9/2013 | Eveland |
| 2014/0032259 A1 | 1/2014 | LaFever et al. |
| 2014/0032406 A1 | 1/2014 | Roach et al. |
| 2014/0229334 A1 | 8/2014 | Shirk et al. |
| 2014/0344080 A1 | 11/2014 | Rothman et al. |
| 2018/0083843 A1 | 3/2018 | Sambandam |
| 2019/0259046 A1 | 8/2019 | Semprevivo et al. |
| 2019/0272272 A1 | 9/2019 | Semprevivo et al. |
| 2019/0362382 A1 | 11/2019 | Cook |
| 2020/0082439 A1 | 3/2020 | Leteux et al. |
| 2022/0414711 A1 | 12/2022 | Leteux |

FOREIGN PATENT DOCUMENTS

| | | |
|---|---|---|
| JP | 2003-016261 | 1/2003 |
| TW | 256569 | 6/2006 |
| WO | WO 91/03789 | 3/1991 |
| WO | WO 97/023838 | 7/1997 |
| WO | WO 99/033012 | 7/1999 |
| WO | WO 99/046710 | 9/1999 |
| WO | WO 02/027610 | 4/2002 |
| WO | WO 03/071388 | 8/2003 |
| WO | WO 2004/046882 | 6/2004 |
| WO | WO 2005/036859 | 4/2005 |
| WO | WO 2006/110873 | 10/2006 |
| WO | WO 2008/057853 | 5/2008 |

OTHER PUBLICATIONS

"Impac Funding Introduces Enhanced Website for Static Pool Tracking of MBS Transactions," Webpage printed out from http://www.lewtan.com/press/1208044_Impac-Lewtan.htm on Mar. 20, 2008.

"Intelligent Miner Applications Guide"; Chapters 4-7; pp. 33-132; IBM Corp., Apr. 2, 1999.

"PrimeQ Lead Validation Techniques Gets Stronger", http://66.102.7.104/search?q=cache:qXAdm0EXcwYJ:www.primeq.com/absolutenm/anmv in 2 pages, Nov. 29, 2005.

"Why Should You Use LeadVerifier?", LeadVerifier, https://web.archive.org/web/20051105043240/www.leadverifier.com/LeadVerifier_

(56) References Cited

OTHER PUBLICATIONS

Why.asp, as archived Nov. 5, 2005, pp. 2.

Authenticom, "What's in A Name?", downloaded from http://web.archive.org/web/20070708185835/http://www.authenticom.com/story.html, 1 page, Apr. 1, 2009.

Authenticom, Technical Specs, "Confidence Level Indicators (CLI)", downloaded from http://www.authenticom.com/confidence_level_indicators.shtml, 2 pages, Aug. 17, 2006.

Bharadwaj et al., "Sustainable Competitive Advantage in Service Industries: A Conceptual Model and Research Propositions", Journal of Marketing, Oct. 1993, vol. 57, No. 4, pp. 83-99.

Bitran et al., "Mailing Decisions in Catalog Sales Industry", Management Science (JSTOR), vol. 42, No. 9, pp. 1364-1381, Sep. 1996.

Caliendo, et al.; "Some Practical Guidance for the Implementation of Propensity Score Matching"; IZA:Discussion Paper Series; No. 1588; Germany; May 2005.

ChannelWave.com, PRM Central—About PRM, http://web.archive.org/web/20000510214859/http://www.channelwave.com as printed on Jun. 21, 2006, May 2000 Archive.

Chores & Allowances. "Do Kids Have Credit Reports?", Oct. 15, 2007, http://choresandallowances.blogspot.com/2007/10/do-kids-have-credit-reports.html.

Chung, Charles, "Multi-Channel Retailing Requires the Cleanest Data—But Don't Expect it From the Customer", Internet Retailer, Jan./Feb. 2002, pp. 61-62.

Cowie, Norman, Warning Bells & The Bust-Out, Business Credit, Jul. 1, 2000.

Dymi, Amilda, Need for Leads Spurs Some Upgrades, Origination News-Special Report, May 1, 2008, vol. 17, Issue No. 8, pp. p. 24, Atlanta, Copyright 2008 SourceMedia, Inc.

EFunds Corporation, Data & Decisioning, Debit Report, as printed on Apr. 1, 2007, http://www.efunds.com/web/industry-solutions/financial-services/frm-debit-report/htm, 1 page.

EFunds Introduces QualiFileSM; Deluxe Corporation; Sep. 1999; Milwaukee, WI.

Erschik, Richard, Sales Leads Can Truly Be Seeds of Sales, The Journal of Business & Industrial Marketing, Summer/Fall 1989, vol. vol. 4, Issue No. 2.

Fair Isaac Introduces Falcon One System to Combat Fraud, Business Wire, May 5, 2005.

Fair Isaac Offers New Fraud Tool, National Mortgage News & Source Media, Inc., Jun. 13, 2005.

FinExtra, Basepoint Analytics Introduces Predictive Technology for Mortgage Fraud, May 10, 2005.

Gibbs, Adrienne; "Protecting Your Children from Identity Theft," Nov. 25, 2008, http://www.creditcards,com/credit-card-news/identity-ID-theft-and-kids-children-1282.php.

Greco, Susan, The Rating Game: Grade you Leads to Clear the Pipe Dreams from you Sales Pipeline, Online Reprint, Jan. 1998, vol. vol. 20. Issue No. 1, pp. p. 93 (1-3).

Griggs, Robyn, Give us Leads! Give us Leads!, Sales and Marketing Management, Jul. 1997, vol. 149, Issue 7, pp. ABI/Inform Global, p. 66.

Hennessey, Hubert D., Software Propels the Selling Cycle, Software Magazine, Jun. 1988, vol. 8, Issue 8, pp. ABI/Inform Global p. 57-64.

ID Theft Assist, "Do You Know Where Your Child's Credit Is?", Nov. 26, 2007, http://www.idtheftassist.com/pages/story14.

Industry News, New Technology Identifies Mortgage Fraud: Basepoint Analytics Launches FraudMark, Inman News, Oct. 5, 2005, American Land Title Association.

International Search Report and Written Opinion for PCT/US2007/006070, dated Nov. 10, 2008.

International Search Report and Written Opinion for PCT/US2007/083055, dated Jan. 7, 2009.

International Search Report and Written Opinion for PCT/US2007/63822, dated Sep. 11, 2007.

International Search Report and Written Opinion for PCT/US2007/63823, dated Oct. 24, 2007.

International Search Report and Written Opinion for PCT/US2007/63824, dated Oct. 9, 2007.

International Search Report and Written Opinion for PCT/US2008/064594, dated Oct. 30, 2008 (Our Reference EXP,192VPC).

Jacob et al., A Case Study of Checking Account Inquiries and Closures in Chicago, The Center for Financial Services Innovation, Nov. 2006.

Lamons, Bob; Be Smart: Offer Inquiry Qualification Services, Marketing News, Nov. 6, 1995, vol. 29, No. 23, ABI/Inform Global, p. 13.

Leadmaster; http://web.archive.org/web/20001206021800/http://leadmaster.com/index.html as printed on Jan. 18, 2006, Dec. 2000.

LifeLock, "How LifeLock Works," http://www.lifelock.com/lifelock-for-people, accessed Mar. 14, 2008.

LifeLock, "LifeLock Launchhes First ID Theft Prevention Program for the Protection of Children," Oct. 14, 2005 Press Release, posted on http://www.lifelock.com/about-us/press-room/2005-press-releases/lifelock-protection-for-children.

LifeLock; "How can LifeLock protect my kids and family?," http://www.lifelock.com/lifelock-for-people/how-we-do-it/how-can-lifelock-protect-my-kids-and-family, accessed Mar. 14, 2008.

Loshin, Intelligent Enterprise: Better Insight for Business Decisions, "Value-Added Data: Merge Ahead", Feb. 9, 2000, vol. 3, No. 3, 5 pages.

LowerMyBills, Inc., "Lower Your Mortgage with a Lender You Can Trust" http://web.archive.org/web/20071110203156/http://www.lowermybills.com/ dated Nov. 10, 2007 in 11 pages.

MarketSoft.com, Turning Inquiries into Revenue: Leads are the Key, eLeads MarketSoft http://web.archive.org/web/20000309005815/marketsoft.com.product.index.htm as printed on Jun. 22, 2006, Feb. 2000.

Otter, et al., "Direct Mail Selection by Joint Modeling of the Probability and Quantity of Response", Jun. 1997, pp. 14.

Polatoglu et al., "Theory and Methodology, Probability Distributions of Cost, Revenue and Profit over a Warranty Cycle", European Journal of Operational Research, vol. 108, Issue 1, Jul. 1998, pp. 170-183.

Rap Interactive, Inc. and Web Decisions: Proudly Presents Live Decisions, A Powerful New Information and Technology Resource that Revolutionizes Interactive Marketing, downloaded from www.webdecisions.com/pdf/LiveDecisions_Bro.pdf, as printed on Aug. 13, 2007, pp. 2.

Real IQ, "Lead Metrix", downloaded from http://www.realiq.com/leadmetrix.html, 1 page, Aug. 17, 2006.

Real IQ, "Mortgage Industry", downloaded from http://www.realiq.com/mortgage.html, 4 pages, Aug. 17, 2006.

Real IQ, RealIQ.com, retrieved from web.archive.org http://replay.web.archive.org/20051212152337/http://www.realiq.com/mortgage.html as printed on Apr. 28, 2011, 2 pgs.

SalesLogix.net, SalesLogix Sales Tour, http://web.archive.org/web/20010411115938/www.saleslogix.com/home/index.php3celli . . . as printed on Aug. 30, 2005, Apr. 2000, pp. 19 pages.

ServiceObjects, "DOTS Web Services—Product Directory", downloaded from http://www.serviceobjects.com/products/directory_of_web_services.asp, 4 pages, Aug. 17, 2006.

ServiceObjects, "Real-Time Customer Intelligence for a Nickel", downloaded from http://www.serviceobjects.com/products/default.asp, 3 pages, Aug. 17, 2006.

Steele, Georgia, Pipeline Software Tracks Process; Tired of Dealing with Lead Generation Firms, CitiPacific Mortgage has built a tool that will allow Mortgage Originators to Track Leads in an Integrated Sales and Marketing Approach, Broker Magazine, Mar. 2006, vol. 8, Issue Iss. 2, pp. 26, New York.

Stein, Benchmarking Default Prediction Models: Pitfalls and Remedies in Model Validation, Moody's KMV, Revised Jun. 13, 2002, Technical Report #020305; New York.

Sumner, Anthony, "Tackling the Issue of Bust-Out Fraud", Retail Banker International, Jul. 24, 2007, pp. 4.

Tao, Lixin; "Shifting Paradigms with the Application Service Provider Model"; Concordia University, Canada; IEEE; Oct. 2001.

TARGUSinfo: "Intermark Media Slashes Returned Lead Costs, Improves Affiliate Relations," downloaded from www.targusinfo.com, 2007, pp. 4.

(56) References Cited

OTHER PUBLICATIONS

TARGUSinfo: Lead Verification, Verify Your Leads With Unique Accuracy And Ease, downloaded from www,targusinfo.com/solutions/verify/Default.asp, as printed Aug. 1, 2006, pp. 1.
TARGUSinfo: Solutions: Services: Verify Express—Verify, Correct and Enhance Customer Provided Data, http:www.targusinfo.com/solutions/services/verify/ Oct. 28, 2005, 27 pgs.
The Center for Financial Services Innovation, A Case Study of Checking Account Inquiries and Closures in Chicago, Nov. 2006.
Thoemmes, Felix; "Propensity Score Matching in SPSS"; Center for Educational Science and Psychology, University of Tübingen; Jan. 2012.
Truston, "Checking if your child is an ID theft victim can be stressful," as posted by Michelle Pastor on Jan. 22, 2007 at http://www.mytruston.com/blog/credit/checking_if_your_child_is_an_id_theft_vi.html.
Vamosi, Robert, "How to Handle ID Fraud's Youngest Victims," Nov. 21, 2008, http://news.cnet.com/8301-10789_3-10105303-57.html.
W.A. Lee, American Banker: The Financial Services Daily, Experian, On Deal Hunt, Nets Identity Theft Insurer, Jun. 4, 2003.
Web Decisions, "Live Decisions", downloaded from http://www.webdecisions.com, 2 pages, Sep. 18, 2006.

\* cited by examiner

| Match key | Mortgage | Credit Card | Auto | Personal | Checking/Savings | Other | Group | Start Year |
|---|---|---|---|---|---|---|---|---|
| SMIT1832211125 | Y | Y | N | N | N | N | | 1990 |
| JONEW92604102 | N | N | Y | Y | N | N | | 2002 |
| GARCJ0213845 | N | N | N | N | Y | N | | 1997 |
| THOMS021411514 | N | N | N | N | N | N | | 2001 |
| BROW143424324 | Y | N | Y | Y | N | N | | 1987 |
| HUNTE93221737 | Y | N | N | N | N | N | | 1993 |
| SNEAS01345801 | N | Y | N | N | N | N | | 2005 |

*FIG. 2*

| | Field Name | Description | Format | Expected Value | Additional Data | Example |
|---|---|---|---|---|---|---|
| 305 | First Name | Customer First Name | Alpha | | | Noah |
| 310 | Last Name | Customer Last Name | Alpha | | Will be used to match consumer. If prefer LowerMyBills can work with you to come up with a Match Key rather than transfer specific consumer info | Staiman |
| 315 | Address | Customer Address | Alphanumeric | | | 2309 Roark Drive |
| 320 | City | Customer City | Alpha | | | Alhambra |
| 325 | State | Customer State | Alpha | | | CA |
| 330 | Zip | Customer Zip | Numeric | | | 91803 |
| 335 | Mortgage Account | Indicate whether consumer has mortgage account | Alpha | Y/N | | N |
| 340 | Credit Card Account | Indicate whether consumer has Credit Card Account | Alpha | Y/N | Consumer needs to have one type of account select to Y or all can be set to N if you have a Grouping structure but group number must be provided in Customer Group | N |
| 345 | Auto Loan Account | Indicate whether consumer has auto loan Account | Alpha | Y/N | | N |
| 350 | Personal Loan Account | Indicate whether consumer has Personal Loan Account | Alpha | Y/N | | N |
| 355 | Checking/Savings Account | Indicate whether consumer has Checking/Savings Account | Alpha | Y/N | | Y |
| 360 | Other Account | Indicate whether consumer has another type of Account | Alpha | Y/N | | N |
| 365 | Customer Group | If you have Broken Targets into Groups or Deciles you can provide this rather than account detail | Alphanumeric | Alphanumeric | Group Number needed if using groups rather than provide account above | |
| 370 | Customer Start Year | Year Customer Became Active with your Bank | Numeric | YYYY | | 1988 |

FIG. 3

SYSTEM AND METHOD OF GENERATING EXISTING CUSTOMER LEADS

BACKGROUND

Field of the Disclosed Embodiments

Embodiments of the systems and methods described herein relate to generating existing customer leads.

Description of the Related Art

Consumer lead generation is a large and growing industry. The lead generation industry identifies individual or business consumers that may be interested in buying products or services and sells contact information for those consumers to providers of the products or services. For example, a residential loan lead generation company, such as LowerMyBills.com, identifies consumers interested in getting a residential loan and sells the consumers' contact information to lenders of residential loans. A "lead," as used herein, generally comprises contact information or other consumer information of a potentially interested buyer of goods or services.

Lead generation companies sell leads for many products and services, including residential loans, commercial loans, real estate agents, automobiles, attorneys, housecleaners, and many other products and services. Providers of such products and services buy leads because leads effectively identify consumers that are already interested in the providers' products and services. Accordingly, leads often result in more sales than advertising, cold calling, or other forms of salesmanship.

SUMMARY

In this application we describe embodiments of systems and methods of generating existing customer leads. In many cases, lead generation companies generate leads for vendors. Vendors often desire to obtain leads that provide information about potential customers in order to have a chance to obtain new business. It can be beneficial, however, for a vendor to also obtain leads that provide information about consumers that are already customers of the vendor. In this application, we refer to such leads as "existing customer leads." One advantage of receiving an existing customer lead is that the vendor becomes aware, upon receipt of the lead, that the vendor's customer may be considering doing business with another vendor. In some cases, such a customer may keep old accounts with the existing vendor but may open new accounts with the other vendor. In other cases, such a customer may close its existing accounts and transfer the business to the other vendor. In either case, the existing vendor has an opportunity to retain its business or expand its business with the customer if the vendor can convince the customer that the existing vendor provides the best goods or services at the desired price.

Additionally, it is generally understood that the costs of obtaining a new customer (e.g. advertising, promotional pricing or discounting, and other costs) are often higher than the costs of retaining an existing customer. Accordingly, many vendors, upon finding out that an existing customer may be considering doing business with a different vendor, may desire to make an offer or deal with the customer, or to otherwise try to retain the customer. The embodiments of the systems and methods described herein give vendors a chance to retain their customers or to expand their business with their customers by alerting the vendors when an existing customer has requested to be matched with competing vendors. The request to be matched with competing vendors is, of course, one sign that suggests that the customer may be considering to change vendors or to do new business with a different vendor.

An existing customer lead generation system, in accordance with some embodiments described herein, may benefit consumers, vendors, and lead generation companies. Consumers may benefit because they may receive offers or deals from existing vendors seeking to retain or expand their business. Accordingly, consumers may be able to improve the terms of existing contracts or other business arrangements with their vendors. Vendors may benefit because they may be able to persuade existing customers to continue doing business (or even expanding their business) with the vendor at a cost that is less than the cost of obtaining new customers. Lead generation companies may benefit by selling leads that are more useful and valuable to vendors and that thus command a higher premium.

One embodiment of an existing customer lead generation system comprises a database of existing customer information for one or more vendors and a matching engine configured to determine when a consumer is an existing customer of one or more vendors and to match the consumer with vendors according to vendor-defined criteria. In this embodiment, the matching engine compares leads, from whatever source obtained, with information about existing customers that is stored in the existing customer information database. The matching engine can then compare the lead with vendor-defined criteria to determine whether to match the consumer with any existing vendors. In this fashion, the system can transmit leads of existing customers to vendors that, according to their criteria, want to receive those leads.

A lead may identify a consumer that is an existing customer of one vendor but is not an existing customer of another vendor. Accordingly, the customer information database preferably identifies existing customers on a vendor-by-vendor basis. In one embodiment, a separate customer information database exists for each vendor. For example, one customer information database may include the existing customers of ABC Mortgage Company and a separate customer information database may include the existing customers of Specialty Financing. Alternatively, the system may use a single customer information database that includes records designating which vendor or vendors a consumer is an existing customer of.

In one variation, the system periodically receives updates to the customer information database. In one advantageous variation, the vendors provide the system with their customer information. For example, each vendor may create a customer information file that the system periodically downloads and uses to update the system's customer information database. Alternatively, vendors may transmit customer information to the system in real time so that the system can update the customer information database immediately. Alternatively, the vendors may maintain their own customer information databases that the system may query in real time just prior to matching consumers with vendors. These methods of updating the customer information database (or of querying vendor-maintained databases) allow each vendor, rather than the system, to define the vendor's existing customers.

Optionally, the systems and methods allow each vendor to define the vendor's set of existing customers without requiring the vendor to disclose complete consumer contact information associated with each customer. In one embodiment, the consumer information database stores only a portion of the contact information of each customer, such as, for example, a limited number of letters in the customer's first and last name, the customer's five-digit zip code, and the numerical values of the customer's street address. Advantageously, the amount of information stored, while not enough to reveal the full contact information, is preferably enough to determine whether the consumer is an existing customer.

Not requiring the vendor to disclose complete consumer contact information is advantageous in at least three ways. First, it requires fewer computational and storage resources because less information must be transmitted and stored. Second, it increases the vendor's trust in the existing customer lead generation system because the system does not receive enough contact information to sell leads based on the vendor's information to another vendor. Third, it reduces or eliminates consumer privacy concerns because the limited amount of information that is transmitted is unlikely to result in the disclosure of sensitive information.

Herein we describe examples or embodiments of systems and methods to generate existing customer leads such that a skilled artisan will understand a few different ways to make and use the invention. However, the invention is not limited to just the described embodiments. Rather, the invention encompasses each disclosed embodiment individually, any combination or subset of the disclosed embodiments, and any variation of the disclosed embodiments that is appreciated by a skilled artisan in light of this disclosure. For example, while we describe many advantageous features and components, a skilled artisan will appreciate, in light of this disclosure, that these features and components are not necessary parts of every embodiment, but can be omitted from or changed in some embodiments.

BRIEF DESCRIPTION OF THE DRAWINGS

FIG. 2 illustrates existing customer information in accordance with an embodiment of the systems and methods disclosed herein.

FIG. 3 is a table that illustrates a format for expanded customer information in accordance with an embodiment of the systems and methods disclosed herein.

DETAILED DESCRIPTION OF PREFERRED EMBODIMENTS

Figure 1:
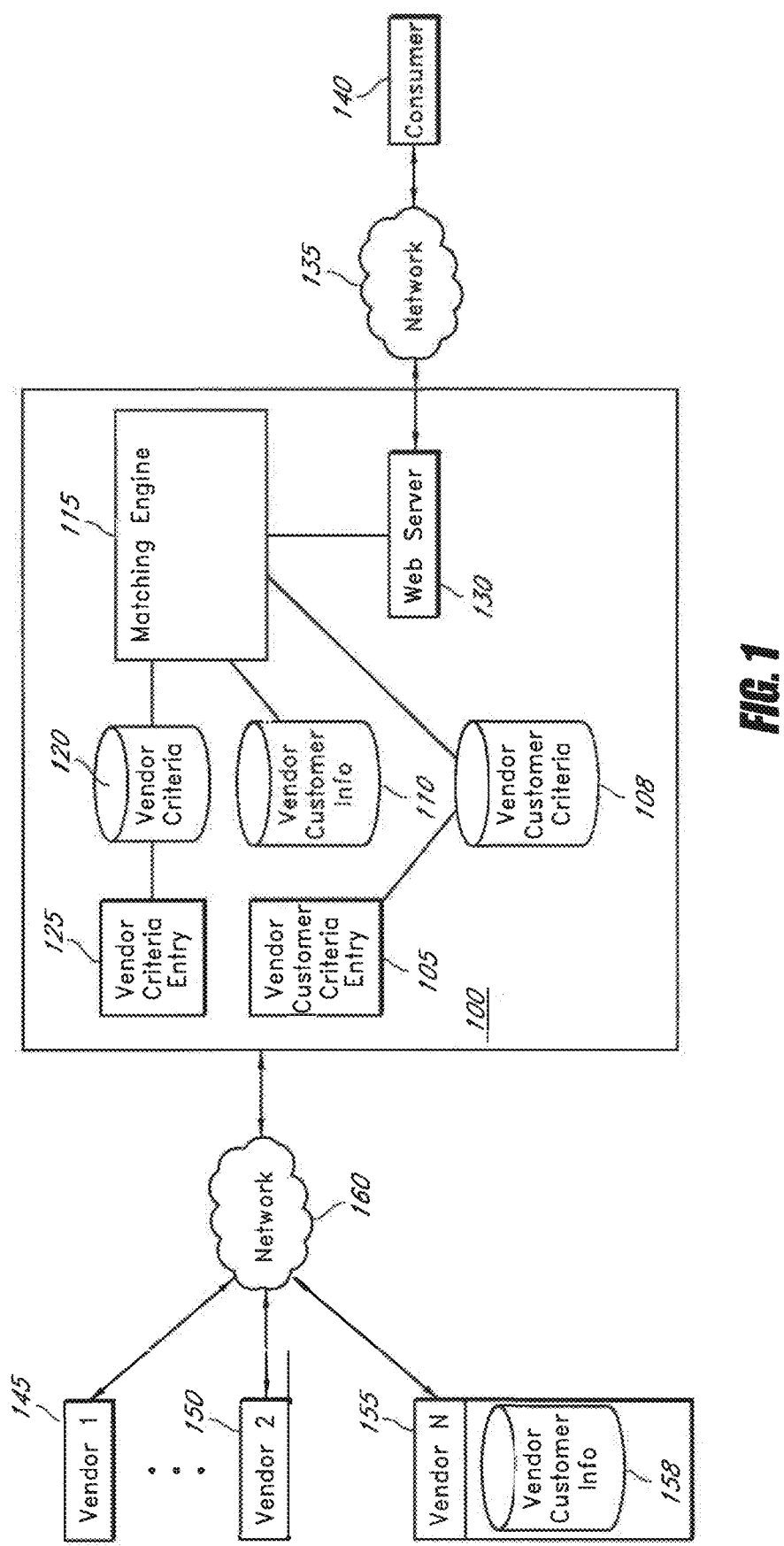
FIG. 1 is a block diagram that illustrates one embodiment of an existing customer lead generation system connected to a network.

FIG. 1 is a block diagram that illustrates one embodiment of an existing customer lead generation system connected to a network. The existing customer lead generation system 100 of FIG. 1, and the embodiments of other figures, may be implemented in the context of a loan lead generation system such as the system embodied at the web site www.lowermybills.com. We offer this context to illustrate one concrete application of the existing customer lead generation system 100 in order to help a skilled artisan understand how the existing customer lead generation system 100 may be used in practice. The invention, however, is not limited to generating existing customer leads for the lending industry. Rather, a skilled artisan will appreciate, in light of this disclosure, that the systems and methods described herein can be used to generate leads for any industry, including, without limitation, the residential loan industry, the commercial loan industry, the real estate industry, the automobile industry, the legal industry, or any other industry. The term "vendor" refers broadly to any potential lead buyer, of whatever industry, that offers one or more products or services.

To further illustrate a concrete application of the existing customer lead generation system 100, we describe the existing customer lead generation system 100 in the context of a lead generation system that generates leads using the Internet. An example of such a lead generation system is found on the web site located at www.lowermybills.com. This site prompts a consumer interested in obtaining a loan to enter his own contact information into a web-based form and sends the contact information to a group of matched lenders. In one embodiment, the group of matched lenders is selected by the system without any input from the consumer. Alternatively, the consumer may help select some or all of the lenders.

In one embodiment, components of an Internet-based lead generation system include a matching engine 115, a vendor criteria database 120, a vendor criteria entry component 125, a vendor customer criteria database 108, a vendor customer criteria entry component 105, and a web server 130. In general, the lead generation system generates a lead when a consumer 140 accesses the web server 130 over a network 135 such as the Internet. The web server 130 serves web pages that prompt the consumer 140 to enter his contact information into a web-based form. The consumer 140 may also be prompted to enter other information to assist the system to match the consumer 140 with vendors that offer the products or services that the consumer 140 wants.

Generally, the vendor criteria database 120 includes criteria that define characteristics of consumers with whom each vendor wants to be matched. In the context of lending, a lender's criteria may specify that the lender wants to be matched with consumers that have excellent credit and that seek a home purchase loan for more than $300,000. In the context of selling cars, a car dealer's criteria may specify that the dealer wants to be matched with consumers that want to buy a new Honda car with a Manufacturer's Suggested Retail Price of at least $15,000. Generally, the matching engine 115 compares characteristics of the consumer 140 with the vendor criteria database 120 to match the consumer 140 with one or more vendors. In some cases the consumer 140 may not meet any vendor's criteria and the matching engine 115 may not make a match.

The vendor customer criteria database 108, in one embodiment, also stores criteria that define characteristics of consumers with whom each vendor wants to be matched. In one embodiment, the vendor customer criteria database 108 stores criteria that relates specifically to consumers that are existing customers of a vendor. Thus, the system 100 may be implemented such that there is a database for storing criteria about non-existing customers (i.e. the vendor criteria database 120) and a separate database for storing criteria about existing customers (i.e. the vendor customer criteria database 108). Maintaining two separate databases may advantageously result in higher processing speed, efficiency, or security. Nevertheless, maintaining two separate databases is not required. Rather, in one embodiment the vendor criteria database 120 stores criteria regarding both existing customers of each vendor and potential new customers of the vendor.

Advantageously, the vendor criteria database 120 and the vendor customer criteria database 108 may provide different criteria for matching with existing customers than for matching with potential new customers. For example, a vendor may have relaxed criteria for receiving a lead from an existing customer. In the context of mortgage loan leads, for example, a vendor may choose to be matched with existing customers seeking refinance loans of at least $100,000 but may choose to be matched with potential new customers seeking refinance loans of more than $200,000. Many factors may influence the willingness to serve existing customers under relaxed criteria, including the following: (1) it may cost less to retain an existing customer than it does to earn the business of a new customer, (2) retaining existing customers may involve less risk (e.g. less risk of default) than acquiring new customers, (3) retaining existing customers may lead to increased sales because customers that are successfully retained may speak well of a vendor or recommend a vendor to other consumers, and (4) existing customers who are successfully retained may later purchase additional goods and services.

In one embodiment, the vendor customer criteria database 108 includes criteria based on an existing customer's status with a vendor, in addition to the mere fact of being an existing customer. For example, in one embodiment a vendor is able to specify certain circumstances under which the vendor wants to receive a lead for a consumer that has been a customer for 5 years and to specify different circumstances for a consumer that has been a customer for a few months. Alternatively or additionally, a vendor may specify that it wants a lead for a customer that has conducted a high dollar volume of business with the vendor but that it does not want a lead for a customer that has conducted a very low dollar volume of business with the vendor. A skilled artisan will appreciate, in light of this disclosure, that the matching engine 115 should be configured such that it has access to sufficient information to evaluate whether any given criteria is met. Thus, for example, if criteria specifies that a vendor wants a lead for a customer that has conducted a high dollar volume of business with the vendor, the matching engine 115 should have access to information about the dollar volume of the business conducted between the customer and the vendor. Such information is stored, in one embodiment, in the vendor customer information database 110. Alternatively, the information may be stored in a separate database that may be local or remote to the system 100 and that may be queried as needed.

A skilled artisan will appreciate, in light of this disclosure, that vendor criteria may differ widely among vendors. Some vendors, for example, may want to receive leads for all existing customers, without regard to any other criteria, while other vendors may define strict additional criteria such that they receive only a small fraction of leads for existing customers. Preferably, the system 100 provides flexibility by allowing each vendor to precisely specify its own criteria. While it is preferred that the criteria can be defined with a great degree of precision and take into account multiple variables to provide the most flexibility to vendors, there is no required minimum number of variables that the system 100 must take into account.

In one embodiment, the vendor criteria database 120 and the vendor customer criteria database 108 also store a bounty, or price, that the vendor is willing to pay to receive a lead that meets certain criteria. For example, a vendor may specify a bounty of $50 for a lead of an existing customer seeking a $500,000 loan but may specify a bounty of just $20 for a lead of an existing customer seeking a $200,000 loan. Alternatively or additionally, a vendor may specify a bounty of $50 for a lead of an existing customer seeking a $500,000 loan but may specify a bounty of just $25 for a lead of a consumer who is not an existing customer that is seeking a $500,000 loan. A skilled artisan will appreciate that many factors influence the bounty that a vendor is willing to pay for a lead, including the potential value of a successful transaction, costs of completing a successful transaction (e.g. costs of communicating with a potential buyer and/or having a salesperson meet with a potential buyer to try to close a deal), the probability of completing a successful transaction, and the like. In alternative embodiments, no bounty is stored or the bounty is stored in a database separate from the vendor criteria database 120 and the vendor customer criteria database 108.

As will be appreciated, the criteria that may be defined by a vendor and stored in the vendor criteria database 120 and the customer criteria database 108 depends on the type of data that is available about the consumer, the good or service that the consumer may purchase, and other data. For example, if data about a consumer's annual income is available, that data may provide the basis for the criterion that a vendor wants to receive a lead only for consumers with annual incomes above $100,000. As will be appreciated, the type of data that is available to the system may vary based on the industry for which leads are to be generated, as certain data may be relevant to one industry but not relevant to another. As the systems and methods can be used for generating leads for any industry, a complete list of the possible data fields that may be stored and upon which criteria can be based cannot be set forth in this application. Some data fields that may be relevant within the context of the home mortgage lead industry are as follows: (1) annual income, (2) value of property, (3) loan to value ratio, (4) credit score, (5) other outstanding debt (e.g. credit card debt, student loans, automobile loans, and other debt), (6) mortgage loan type, (7) home description, (8) purchase year, (9) property address/location, (10) current mortgage value, (11) current mortgage rate, and (12) existing mortgage type.

Generally, the vendor criteria entry component 125 comprises computer-executable instructions stored on a computer-readable medium that are configured, when executed by a general-purpose computer, to allow a user to update the vendor criteria database 120. Alternatively, the vendor criteria entry component 125 may be implemented as a hardware component, a firmware component, or a component that is some combination of hardware, firmware, and software, that performs the equivalent function. A skilled artisan will understand that hardware, firmware, software, or combination implementations are equivalent, and will understand how to make and use any of these implementations. The term "vendor criteria entry component" encompasses all of these implementations. In one embodiment, the vendor criteria entry component 125 is accessible to a plurality of vendors 145, 150, and 155 over a network 160, such that the vendors 145, 150, and 155 can directly update their own criteria. Alternatively, the vendor criteria entry component 125 is not accessible to the vendors 145, 150, and 155, such that a person or automated process affiliated with the lead generation system must update the vendor criteria database 120. The network 160 may or may not be the same network as the network 135.

Generally, the vendor customer criteria entry component 105 comprises computer-executable instructions stored on a computer-readable medium that are configured, when executed by a general-purpose computer, to allow a user to update the vendor customer criteria database 108 with respect to criteria associated with existing customers of a vendor. Alternatively, the vendor customer criteria entry component 105 may be implemented as a hardware component, a firmware component, or a component that is some combination of hardware, firmware, and software, that performs the equivalent function. A skilled artisan will understand that hardware, firmware, software, or combination implementations are equivalent, and will understand how to make and use any of these implementations. The term "vendor customer criteria entry component" encompasses all of these implementations. In one embodiment, the vendor customer criteria entry component 105 is accessible to a plurality of vendors 145, 150, and 155 over a network 160, such that the vendors 145, 150, and 155 can directly update their own criteria. Alternatively, the vendor customer criteria entry component 105 is not accessible to the vendors 145, 150, and 155, such that a person or automated process affiliated with the lead generation system must update the vendor criteria database 108. The network 160 may or may not be the same network as the network 135.

Generally, the matching engine 115 comprises computer-executable instructions stored on a computer-readable medium that are configured, when executed by a general-purpose computer, to match the consumer 140 to one or more vendors based on vendor criteria and characteristics of the consumer 140. Alternatively, the matching engine 115 may be implemented as a hardware component, a firmware component, or a component that is some combination of hardware, firmware, and software, that performs the equivalent function. A skilled artisan will understand that hardware, firmware, software, or combination implementations are equivalent, and will understand how to make and use any of these implementations. The term "matching engine" encompasses all of these implementations.

In one embodiment, the matching engine 115 matches the consumer 140 with vendors by comparing characteristics of the consumer 140 with vendor criteria stored in the vendor criteria database 120 and vendor customer criteria stored in the vendor customer criteria database 108. The matching engine 115 may require an exact match (e.g. the consumer 140 meets all of a vendor's criteria) or the matching engine 115 may make matches that are close but not exact (e.g. the consumer 140 meets an acceptable level of the vendor's criteria). In some cases the matching engine 115 may match the consumer 140 with only one vendor, while in others the matching engine 115 may match the consumer 140 with multiple vendors. In some cases, the matching engine 115 may not be able to make any matches because the consumer 140 may have characteristics that do not match any vendor's criteria.

The consumer 140 characteristics may be collected in many ways. One way to collect the consumer 140 characteristics is to have the consumer 140 fill out a web-based form served by the web server 130. The consumer 140 may be asked, for example, to provide his contact information and information about his creditworthiness, job, income, interests, and the like. In some cases the consumer 140 may be asked to estimate some of these characteristics rather than provide an exact value. A skilled artisan will appreciate, in light of this disclosure, that the characteristics requested differ based on the type of lead that is being generated and the type of information that vendors care about for qualifying a consumer as a potential buyer. Thus, in the context of mortgage loans, creditworthiness is an important characteristic. However, in the context of a product such as a computer that the consumer 140 will likely purchase using cash or a credit card, creditworthiness is less important.

Another way to collect the consumer 140 characteristics is to look up information about the consumer 140 stored in a database. An example of this approach is to request a credit report for the consumer 140 after obtaining the Social Security number from the consumer 140. Still other ways to collect consumer 140 characteristics exist outside of the context of web-based lead generation systems. For example, the consumer 140 can be asked to fill out a paper form or to answer questions during a face-to-face or telephone survey or interview.

A web-based lead generation system, such as the example described above, is a preferred way to collect leads for sending to vendors. However, while we describe embodiments of an existing customer lead generation system 100 in the context of such a web-based lead generation system, the existing customer lead generation system 100 can be used for leads generated in other ways, including leads generated from paper forms or from face-to-face or telephone surveys or interviews. It is advantageous to use a computerized method of generating leads because such leads will already be stored in electronic form and can easily be compared to the vendor customer information database 110 described herein. However, non-electronic leads can be manually or automatically converted (such as by optical character recognition or the like) into electronic form so that the existing customer lead generation system 100 can be used with them.

The illustrated existing customer lead generation system 100 comprises the matching engine 115, the vendor criteria database 120, the vendor customer criteria database 108, and the vendor customer information database 110. The vendor customer information database 110 comprises information about existing customers of each vendor. Preferably, the information stored in the vendor customer information database 110 stores enough information about each customer to determine, to an acceptable degree of accuracy, whether a customer is already an existing customer of a given vendor. The acceptable degree of accuracy need not be 100%, and the vendor customer information database 110 need not store complete contact information for each customer. For example, in one embodiment, the vendor customer information database 110 stores, for each customer, four letters of the customer's last name, the first letter of the customer's first name, the customer's zip code, and the numerical values of the customer's street address. This information is sufficient to accurately and uniquely identify almost all consumers in the United States, without requiring the storage of complete contact information for each consumer. Nevertheless, this precise format is not required; a skilled artisan will appreciate that many other formats may be used.

In addition to the customer information used for uniquely identifying a given consumer, the vendor customer information database 110 may also store other information about the customer that may be useful to a vendor. For example, with regard to a mortgage loan lead generation system, the vendor customer information database 110 may store information about whether the customer has a mortgage account with a particular vendor, whether the customer has a credit card account with a particular vendor, what year the customer became a customer of a particular vendor, and the like. This information may be used advantageously by the vendor to better understand the needs or desires of the customer and to generate an offer or deal for the customer that is more likely to retain the customer.

The term "database," as used with respect to the vendor customer information database 110, the vendor customer criteria database 108, and the vendor criteria database 120, encompasses any group of data that stores information about customers or vendor criteria. These databases need not require Structured Query Language ("SQL"), a relational database management system, or any other query language or database management system, for accessing the information stored therein. Moreover, these databases are not limited to any particular format. Rather, these databases may be simple text files that have an entry on each line or multiple entries on a single line separated by commas, tabs, semicolons, or the like. Alternatively, these databases may comprise all or portions of many computer files stored in one or more directories or folders.

An advantageous variant of the existing customer lead generation system 100 periodically updates the vendor customer information database 110 to reflect new information about vendors' customers. In one embodiment, the system 100 stores customer information in the vendor customer information database 110 for a limited time, such as, for example, 1 year. Alternatively, the system 100 may store customer information in the vendor customer information database 110 for 3 months, 6 months, 9 months, 15 months, 18 months, 21 months, 2 years, or any other reasonable period. A skilled artisan will appreciate, in light of this disclosure, that any reasonable time period can be selected in accordance with the needs or preferences of the vendors or the operator of the lead generation system. Alternatively, the system 100 may store customer information in the vendor customer information database 110 until the vendor instructs the system 100 to delete the information.

The time period is preferably set such that the system 100 will likely identify true existing customers rather than former customers. As will be appreciated by a skilled artisan, the appropriate time period may differ based on the type of product or service that the consumer seeks. For example, a customer of a vendor that provides long-term products or services, such as, for example, 30-year fixed mortgages, may be expected to be a long-term customer. For such products or services, a customer can be expected to remain as a customer for longer, and the appropriate time period may be several years. On the other hand, a shorter time period may be appropriate for vendors of inexpensive, frequently replaced, or commodity products for which customers are expected to change vendors frequently.

In various alternative embodiments, a vendor may maintain a vendor customer information database 158 in addition to or in place of the system's vendor customer information database 110. In such embodiments, the system 100 may query the vendor's vendor customer information database 158 in real time at the time that a lead is being generated. If the system 100 determines, based on the query of the vendor's vendor customer information database 158, that the lead is for an existing customer of the vendor, the system 100 refers to the vendor customer criteria database 108 to determine whether to match the lead with the vendor. Advantageously, such an approach ensures that the system 100 accesses the latest customer information maintained by the vendor without requiring the system 100 to periodically update its own vendor customer information database 110. Alternatively, the system 100 can maintain a vendor customer information database 110 that is updated in real time when changes occur in a vendor's vendor customer information database 158. For example, the system's vendor customer information database 110 and the vendor's vendor customer information database 158 may be linked together via Open Database Connectivity ("ODBC") or via any other mechanism for linking databases together. A skilled artisan will appreciate, in light of this disclosure, that there are many mechanisms for linking databases together and that any such mechanism can be used.

In one embodiment, as illustrated by FIG. 1, the vendor customer information database 110 is a local database to the system 100. Moreover, in one embodiment, the vendor customer information database 110 is maintained by the lead generation company. Alternatively, the vendor customer information database 110 may be a remote database and may be maintained by a trusted third-party that is independent of the vendors and the lead generation company. For embodiments in which the vendor customer information database 110 is maintained by a trusted third-party, the system 100 may query the vendor customer information database 110 by sending a match key to the vendor customer information database 110. The system 100 may then receive an indication of whether the consumer is an existing customer of any vendor, without receiving any additional information about the consumer. Vendors that are particularly concerned about security and do not want the lead generation company to have access to too much consumer information may prefer this embodiment.

In one embodiment, not shown, the system 100 may maintain or have access to separate vendor customer information databases for each of a plurality of goods or services. For example, in the context of loans, the system 100 may have one vendor customer information database for refinance loans, home purchase loans, home equity loans, and the like. Some vendors may want to pay different bounties based on which list an existing customer is on.

FIG. 2 illustrates existing customer information that may be stored in the vendor customer information database 110, in accordance with one embodiment. In the illustrated embodiment, customer information 200 comprises a match key 205, a mortgage account indicator 210, a credit card account indicator 215, an automobile loan account indicator 220, a personal loan account indicator 225, a checking or savings account indicator 230, an other account indicator 235, a group field 240, and a start year field 245. The customer information 200 is associated with a particular vendor such that the presence of a particular customer's information means that the particular customer is an existing customer of the vendor. This association between the customer information 200 and the vendor may be accomplished in many ways that will be appreciated by a skilled artisan, including, for example, by storing separate customer lists for each vendor or including a vendor identification field in each customer entry. Any method for associating customer information 200 with particular vendors may be used.

The match key 205 is a code used to identify an existing customer of a vendor. In the illustrated embodiment, the match key 205 comprises the first four letters of a customer's last name, the first letter of the customer's first name, the customer's five-digit zip code, and the numerical values of the customer's street address. Preferably, the match key 205 provides enough information for the system 100 to uniquely identify a very high percentage of consumers, without providing enough information for a person or business to effectively identify and be able to contact the consumer. Using a match key that is not useful for contacting the consumer increases the vendors' confidence that the operator of the system 100 will not sell the vendors' customer information. Additionally, using this type of match key increases security by preventing the release of easily identifiable consumer information in the event of a security breach of the vendor customer information database 110. The illustrated format for the match key 205 is an example only and does not limit the invention to any particular format. Any format for identifying consumers may be used.

The match key 205 provides sufficient, but not necessarily required, information for identifying whether a user of the system 100 is an existing customer of a vendor. As such, the other illustrated fields of the customer information 200 are strictly optional fields that may be used to provide convenient information to a vendor receiving an existing customer lead, to determine whether vendor customer criteria is met, to determine the bounty that the vendor is willing to pay, or the like. Indeed, in one embodiment the customer information 200 includes a match key 205 and no additional information. Any additional information in the customer information 200 is preferably relevant to the type of good or service being offered, such that the additional information can aid the system 100 match the lead with vendors or aid the vendor in trying to complete a sale with the customer.

The additional information illustrated by FIG. 2 is relevant in the context of leads for a loan product. As illustrated, the mortgage account indicator 210 is a binary (Yes/No) value that indicates whether the existing customer currently has a mortgage account with the vendor. The credit card account indicator 215 is a binary value that indicates whether the existing customer currently has a credit card account with the vendor. The automobile loan account indicator 220 is a binary value that indicates whether the existing customer currently has an automobile loan account with the vendor. The personal loan account indicator 225 is a binary value that indicates whether the existing customer currently has a personal loan account with the vendor. The checking/savings account indicator 230 is a binary value that indicates whether the existing customer currently has a checking or savings account with the vendor. The other account indicator 235 is a binary value that indicates whether the existing customer currently has some other kind of account with the vendor. The group field 240 is an alphanumeric field that allows for grouping each customer into a group. In one embodiment, the group field 240 is used in place of the account type indicators. For example, the group field 240 may be used to specify "checking" when the customer is an existing checking account customer. The group field 240 may also be used to store other classification information, in addition to the account type indicators, although this usage is not required and not illustrated by FIG. 2. The start year field 245 indicates the year that the customer became a customer of the vendor.

While the match key 205 alone is sufficient to determine whether a consumer is an existing customer of a vendor, the additional information can be used in a variety of ways to aid the system 100 or the vendor. For example, the vendor customer criteria can be based, at least in part, on the additional information. That is, in the context of mortgage leads, a vendor may specify that it wants to receive leads for existing mortgage account customers but that it does not want to receive leads for existing credit card account customers (who are not also existing mortgage account customers). In addition, the bounty paid by the vendor upon being matched with the customer may depend at least in part on the additional information. For example, a vendor may be willing to pay $50 for leads for existing mortgage account customers but only $20 for leads for existing credit card customers. Alternatively or additionally, the system 100 may report the additional information to the vendor who receives an existing customer lead, for the convenience of the vendor. As the additional information is originally provided by the vendor, the vendor could alternatively look up the information upon receiving an existing customer lead from the system 100, but it may be more convenient for the vendor to receive the information from the system 100 so that this look up step is not required. The vendor could use the information to assess what message, offer, or incentive would be most successful in retaining the customer.

FIG. 2 depicts only one example of the information and the format of the information that may be stored in the vendor customer information database 110. A skilled artisan will appreciate, in light of this disclosure, that the content or format of the information may be different. In particular, the content of the information will differ according to industry because different information is relevant to each industry. In addition, the level of detail of the information may differ. For example, FIG. 3 is a table that illustrates an information format that differs in certain respects from the information format of FIG. 2. Primarily, the format of FIG. 3 differs from FIG. 2 in that full customer names and addresses are stored instead of the match key 205 of FIG. 2. Specifically, in the format specified by FIG. 3, the following fields are stored: a first name field 305, a last name field 310, an address field 315, a city field 320, a state field 325, a zip code field 330, a mortgage account indicator 335, a credit card account indicator 340, an automobile loan account indicator 345, a personal loan account indicator 350, a checking/savings account indicator 355, an other account indicator 360, a customer group field 365, and a customer start year field 370. Many of the fields of FIG. 3 contain the same information as described for FIG. 2, FIG. 3 provides additional explanation of the fields.

A skilled artisan will appreciate, in light of this disclosure, that it is preferable to implement security measures in order to protect the consumer and other information transmitted to and from the system and stored in the system. Some security measures that may be taken include the following: (1) locating databases of sensitive information in an internal network behind a firewall, (2) not connecting databases of sensitive information directly to the Internet, (3) encrypting sensitive information, (4) restricting and controlling access to databases of sensitive information, (5) keeping detailed logs of file updates, file accesses, file modifications, and the like.

Figure 4:
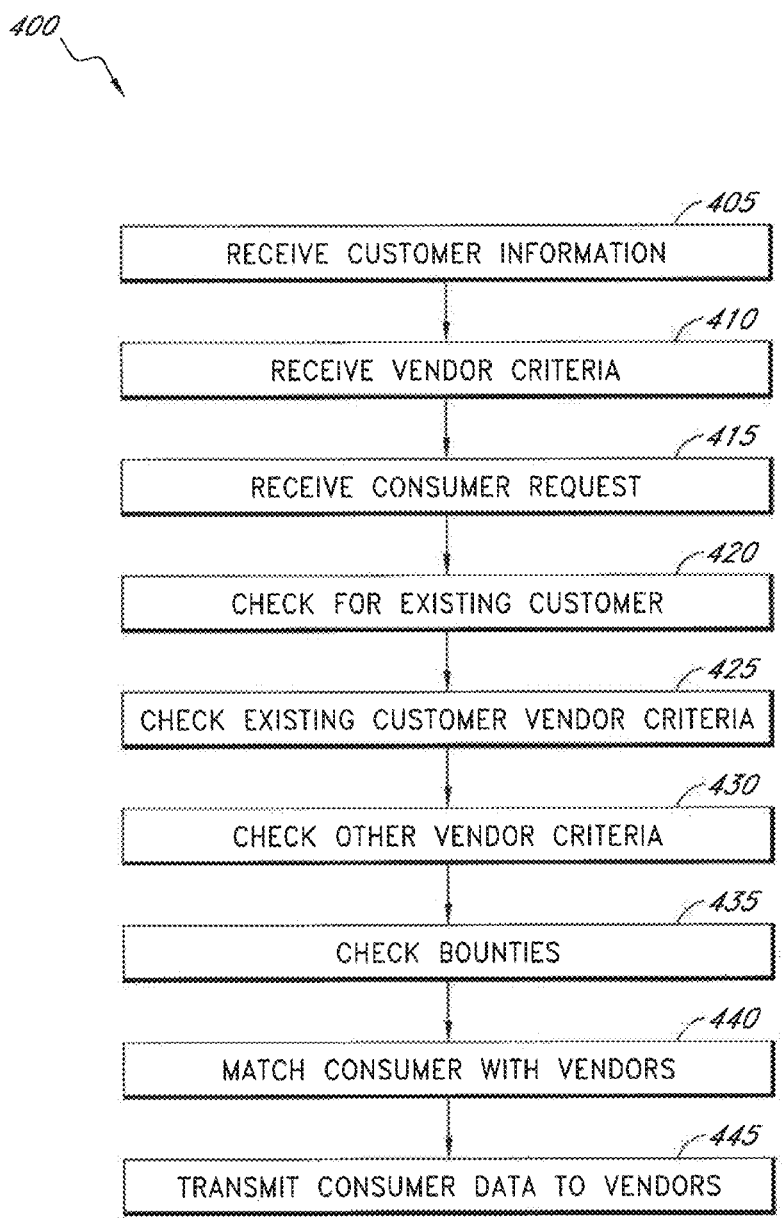
FIG. 4 is a flowchart that illustrates one embodiment of a process of generating existing customer leads.

FIG. 4 is a flowchart that illustrates one embodiment of a process of generating existing customer leads. The process 400 begins at a block 405 in which customer information is received. In one embodiment, the customer information comprises information about existing customers of a vendor. The content and format of the customer information may be as illustrated in FIG. 2 or FIG. 3, or any other content and format that is suitable for the type of leads to be generated. Generally, the customer information is received from a vendor who purchases leads from a lead generation source, although this is not required. The customer information may be received from a third-party that maintains a vendor's customer information or by a third-party that the vendor authorizes to access the customer information for the purpose of transmitting the information to a lead generation source. In one embodiment, the customer information is received from a vendor in electronic form over a network, such as the network 160 of FIG. 1.

The customer information may be received by periodically downloading customer information from a vendor customer information database (such as the vendor customer information database 158) and storing the customer information into a local vendor customer information database (such as the vendor customer information database 110). In one embodiment, the customer information is received by periodic downloading every month. Different time periods may be used. In accordance with various embodiments, the customer information is received using File Transfer Protocol, Extensible Markup Language, Open Database Connectivity, by transfer of a secure compact disc or digital versatile disc, Hypertext Transfer Protocol, any other protocol or method of communicating information, or any combination of protocols or methods of communication.

In a block 410, the process 400 receives vendor criteria. In one embodiment, the vendor criteria comprises criteria about consumer characteristics and other information that defines the types of consumers for which a vendor wants to receive leads. For example, a vendor may specify that the vendor wants to receive leads for consumers that are existing home mortgage customers, that have excellent credit, and that are seeking a refinance loan of at least $400,000. Other criteria may be set based on any data field that is appropriate for the industry for which the leads are being provided. For example, if the leads are for selling personal computers, appropriate criteria may include the make and model of the computer that a consumer is interested in buying, processor speed, amount of memory, and the like. In one embodiment, the vendor criteria is received over a computer network from a remote terminal that the vendor uses to enter criteria data. The terminal used to enter data may be a computer that includes software for entering the criteria data or it may be a web browser that the user uses to complete a web-based form. Alternatively or additionally, some or all of the criteria may be entered by an employee at a lead generation company who receives the criteria to be entered by phone, fax, email, or the like.

In one embodiment, the operation of block 410 includes receiving separate vendor criteria for circumstances in which the consumer is an existing customer of the vendor and for circumstances in which the consumer is not an existing customer of the vendor. Alternatively or additionally, vendor criteria for these differing circumstances may be received together, with part of the vendor criteria being that the consumer is or is not an existing customer. In embodiments, in which separate criteria are received, the separate criteria may be received from different sources, such as, for example, existing customer criteria being received over a network from a software application configured for the entry of existing customer criteria and non-existing customer criteria being received over a network from a software application configured for the entry of non-existing customer criteria.

In a block 415, the process 400 receives a consumer request for information. The consumer request for information may be a request for a quote, a request for a price, a request for a proposal, or simply a request for one or more vendors to contact the consumer. In any case, the consumer request for information preferably includes sufficient information to identify the consumer and what the consumer is requesting. For example, if the consumer wants to buy a new television, the consumer request for information may include several fields indicating the make and model of a desired television and contact information of the consumer. Preferably, the consumer request for information includes enough information about the consumer to determine which vendors are an appropriate match for the consumer and to allow the vendors to contact the consumer. In one embodiment, the consumer request for information is received after being transmitted from a consumer terminal over a computer network.

In one embodiment, the consumer request does not specify the product or service that the consumer seeks. In some cases, it may be unnecessary to specify the product or service because the product or service may be implicitly understood from an agreement or understanding between the lead generation company and the vendor receiving a lead. For example, a lead generation company may offer leads for only one product or service, such as, for example, credit cards, and it may thus be understood that any lead from that lead generation company is for a consumer that seeks a credit card. Accordingly, while it is generally preferred that the consumer request includes information about the requested product or service, this is not a requirement.

In one embodiment, the information about the consumer includes consumer characteristics such as income, a credit rating, debt, occupation, age, gender, address, preferences, and the like. A skilled artisan will appreciate, in light of this disclosure, that not all such categories of information need be part of the consumer characteristics. Any combination of the foregoing characteristics, any combination of the foregoing characteristics with other characteristics not listed, or any combination of not listed characteristics, may be received by the process 400. A skilled artisan will appreciate that different consumer characteristics are relevant to matching consumers to vendors, depending on the industry for which the lead is to be generated. In some industries and circumstances, certain characteristics may not be received, such as age or gender, in order to ensure compliance with certain non-discrimination or other regulations. In one embodiment, at least a portion of the consumer characteristics are received from a remote consumer terminal. In one embodiment, at least a portion of the consumer characteristics are also received from a third-party site, such as the site of a credit bureau, that is located remotely from both the system 100 and the remote consumer terminal. For example, in one embodiment, the process 400 may receive some consumer characteristics from a consumer and, using those characteristics, request and receive additional information, such as a credit score, from a credit bureau. The income characteristic may be an estimate of the consumer's income. The credit rating may be a general classification of creditworthiness, such as excellent credit, good credit, fair credit, poor credit, or the like, or may be a more specific measurement of creditworthiness, such as a credit score.

In a block 420, the process 400 checks to determine if the consumer identified in the consumer request for information is an existing customer of one or more vendors associated with the system. In one embodiment, this check includes searching one or more vendor customer information databases for records identifying the consumer as an existing customer. In one embodiment, the vendor customer information databases stores at least a match key about each existing customer that provides unique identification of customers with a high degree of accuracy. For example, the match key format illustrated by FIG. 2, and described above, may be used. Other match key formats may be used, or a query on multiple fields may be performed. A skilled artisan will appreciate, in light of this disclosure, that using a match key may advantageously allow for uniquely identifying a large majority of consumers while not requiring vendors to disclose consumer information that is sufficient to contact the consumer. In one embodiment, information entered by the consumer is converted into a match key and the match key is then compared against records in the vendor customer information database to determine if the consumer is an existing customer of a vendor. If an exact match is found, the consumer is deemed to be an existing customer of a vendor.

In some embodiments, the consumer is deemed to be an existing customer of a vendor if a close match is found, even if the match is not exact.

In a block 425, the process 400 checks existing vendor criteria of any vendor for whom the consumer is an existing customer to determine if the consumer may be matched with the vendor. For example, in the context of mortgages, if it is determined that a consumer is an existing customer of a particular lender, that lender's existing customer criteria may be checked to determine if the existing customer falls within the categories of consumers about whom the lender wants to receive a lead. In one embodiment, the block 425 occurs only if it is determined, in the block 420, that the consumer is an existing customer of one or more vendors.

In a block 430, the process 400 checks other vendor criteria to match the consumer with vendors for whom the consumer is not an existing customer. For example, if it is determined that a consumer is not an existing customer of a particular lender, that lender's vendor criteria may be checked to determine if the consumer falls within the categories of consumers about whom the lender wants to receive a lead. While the operations of the blocks 425 and 430 are described as separate operations, a skilled artisan will appreciate, in view of this disclosure, that the operations can be combined. For example, the process 400 may check all criteria, including existing customer criteria and non-existing customer criteria, in a single operation.

Performance of the operations of blocks 425 or 430, both operations, or a combination of the two operations, identifies vendors with whom the consumer may be matched and that may receive a lead including the consumer's contact information. However, in some embodiments, the process 400 performs additional processing or filtering to reduce the number of vendors and thus make an ultimate determination of which vendors are to be matched with the consumer. For example, in a block 435, the process 435 checks bounties as part of a process of determining which vendors are to be matched with the consumer. As used herein, a "bounty" is an amount of money that a vendor will pay in order to receive a particular lead. The bounty amount may vary depending on vendor criteria or other factors. For example, a vendor may be willing to pay more for a lead of a consumer that is an existing customer than the vendor would be willing to pay for a lead of a consumer that is not an existing customer.

In one embodiment, the process 400 determines the bounty that each vendor would pay for a particular lead and takes this into account when determining which vendors are to be matched with the consumer. The bounty and possibly other factors are considered in a block 440, in which the process 400 matches the consumer with vendors. In one embodiment, the vendors that will pay the highest bounty are those that are matched with the consumer, without regard to other factors. Alternatively, other factors besides the bounty may be taken into account. One factor that may be taken into account is whether the vendor has already received a duplicate lead. In some embodiments, a lead de-duplication process is executed and vendors that have already received the lead are eliminated and are not matched with the consumer.

Another factor that may be considered is whether matching a vendor with a consumer would conflict with any conflict rules implemented by the process 400. For example, in one embodiment the process 400 executes a conflict checking process and does not match a vendor with a consumer when the match would create a defined conflict. An example of a defined conflict is a situation in which the process 400 matches a consumer with two vendors that are both franchisees of a single company. As the company may not allow its franchisees to compete with each other (e.g. if each franchisee has been granted exclusive geographic regions), this may create a conflict. In one embodiment, the process 400 is able to detect such conflicts by checking a series of conflict rules to determine if a defined conflict exists.

Another factor that may be considered is the preference of the consumer. In one embodiment, the consumer is allowed to make a limited choice as to which vendors are to receive the lead. For example, in one embodiment, the process 400 lists several vendors that may receive the lead of the consumer and allows the consumer to select a subset of vendors that are to receive the lead. The degree to which the consumer may choose the vendors may range from a large degree of choice (e.g. the consumer can select or deselect any number of the vendors) to a small degree of choice (e.g. the consumer can approve or reject the entire list of vendors but cannot select individual members of the list).

A skilled artisan will appreciate, in light of this disclosure, that many other factors may be taken into account in determining which vendors are ultimately matched with the consumer. Ultimately, however, the process 400 considers the applicable factors and determines the matched vendors who are to receive the lead of the consumer. As a skilled artisan will appreciate, in view of this disclosure, the number of matched vendors may vary. In some cases, if the consumer does not meet the criteria of any vendor, the process 400 may not match the consumer with any vendor, and may thus simply inform the consumer that no match occurred. In other cases, the process 400 may match the consumer with only one vendor or the process 400 may match the consumer with a few vendors or even a large number of vendors. Advantageously, the number of matched vendors is adaptable to meet the objectives of any particular system. For example, fewer matches may be desirable because vendors may pay much more for a match with fewer competitors because such a match may increase the chances that the vendor will complete a sale, while more matches may be desirable in order to give the consumer more choice and promote competition for the consumer's business.

In a block 445, the process 400 transmits consumer data to the matched vendors. The transmission may occur using any communication protocol or method, including, for example, e-mail, FTP, HTTP, XML, ODBC, secure CD or DVD transfer, or any other communication protocol or method that is known or that becomes known. In one embodiment, the consumer data transmitted to matched vendors comprises a lead.

Each of the foregoing operations of the process 400 may be performed by one or more general purpose computers, special purpose computers, or electronic devices. Each of the operations may be performed by software or firmware encoded with computer-readable instructions that perform the operations when executed by a computer. Alternatively, some or all of the operations may be performed by a hardware device configured to perform the operations. In one embodiment, the operations of the process 400 are performed by a system such as the system illustrated in FIG. 1. For example, the following components shown on FIG. 1 may perform the following operations: (1) the web server 130 may perform the operation of the block 405 of receiving customer information, the operation of the block 410 of receiving vendor criteria, and the operation of the block 415 of receiving a consumer request; (2) the matching engine 115 may perform the operation of the block 420 of checking whether the consumer is an existing customer of a vendor, the operation of the block 425 of checking existing customer vendor criteria, the operation of the block 430 of checking other vendor criteria, the operation of the block 435 of checking bounties, and the operation of the block 440 of matching the consumer with vendors; and (3) a transmission component (not shown) of the system 100 may perform the operation of the block 445 of transmitting consumer data to vendors.

While specific components of the system 100 of FIG. 1 have been identified that may perform the operations of the process 400, these components and operations have been identified by way of example and not limitation. Other components may participate in performing the operations of the process 400. Indeed, each operation of the process 400 may be performed by a separate component, or multiple operations of the process 400 may be performed by a component other than those illustrated by FIG. 1. As used herein, the term "component" is used broadly to include a hardware component, a software component, a firmware component, or some combination of the foregoing. In one embodiment, the components are implemented in software and comprise computer-executable instructions that, when performed by a computer, perform the operations defined by the computer-executable instructions. A software component is a group of instructions that define an operation, such as receiving customer information, and may comprise one program module, function, procedure, method, or other organizational unit, or may comprise multiple program modules, functions, procedures, methods, or other organizational units. Multiple software components may be encoded into a single program module, function, procedure, method, or other organizational unit. For example, instructions for receiving customer information and instructions for receiving vendor criteria may be included in a single program module.

None of the operations of blocks 405, 410, 415, 420, 425, 430, 435, 440, and 445 is a required operation, and the invention is not limited to a process that performs every one of the operations. In one embodiment, all of the operations of the illustrated process 400 are performed. However, other embodiments omit one, some, or all of the operations of the process 400. A skilled artisan will appreciate, in light of this disclosure, that any group of operations of the process 400 may be combined into unique and advantageous processes, and that the invention (as defined by the original or future claims) may encompass any such embodiments or variations. By way of example and not limitation, in one embodiment a process includes only the operations of receiving a consumer request, checking whether the consumer is an existing customer, checking vendor criteria, matching the consumer with vendors, and transmitting consumer data to vendors.

Figure 5:
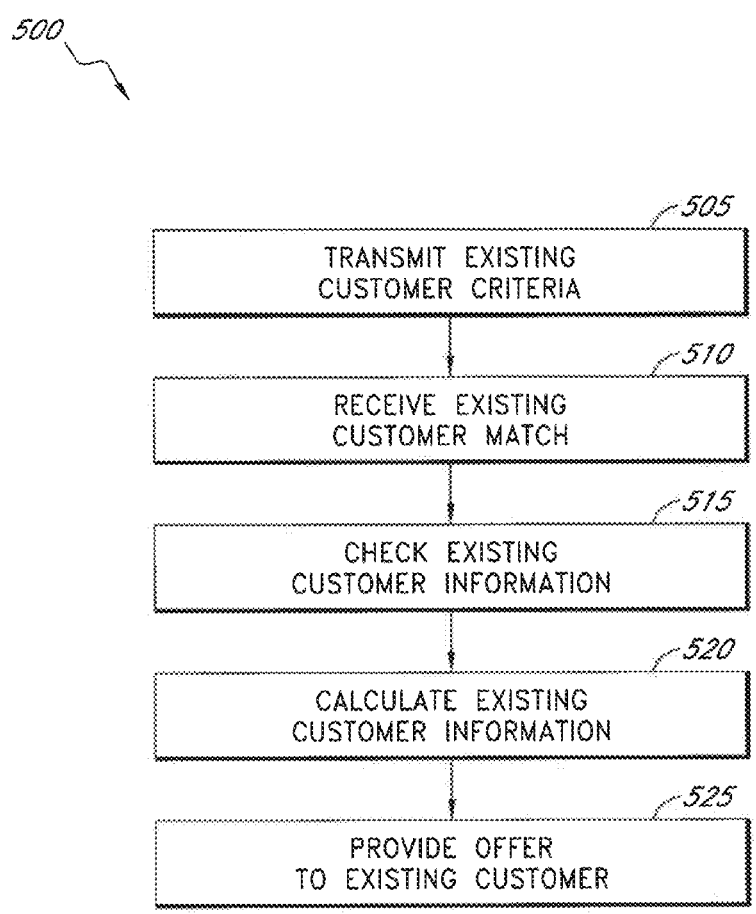
FIG. 5 is a flowchart that illustrates one embodiment of a process of using an existing customer lead to provide an offer to an existing customer.

FIG. 5 is a flowchart that illustrates one embodiment of a process of using an existing customer lead to provide an offer to an existing customer. This flowchart illustrates one way that a vendor may use existing customer leads received from an existing customer lead generation system such as the system 100. A skilled artisan will appreciate, in light of this disclosure, that there are many other ways to use an existing customer lead.

As illustrated in FIG. 5, a vendor may use an existing customer lead to make an offer to an existing customer. The vendor may make the offer in an attempt to retain the business of the existing customer. Many vendors are especially motivated to attempt to retain the business of an existing customer because it is generally understood that it is less expensive to retain the business of an existing customer than it is to generate business from a new customer.

In a block 505, the process 500 transmits existing customer criteria. In one embodiment, transmitting existing customer criteria comprises transmitting criteria that defines the classes of existing customers for whom a vendor wants to receive an existing customer lead from a lead generation company. The existing customer criteria may include a bounty amount that specifies how much the vendor is willing to pay for an existing customer lead.

In a block 510, the process 500 receives an existing customer match. In one embodiment, receiving an existing customer match comprises receiving an identification code for an existing customer. The identification code may be, for example, the match key 205 of FIG. 2. The existing customer match may also include other information, such as, for example, information that a consumer entered into a lead generation system's web site, the existing customer's contact information, and the like. This additional information is not required, however.

In a block 515, the process 500 checks information regarding the existing customer. In one embodiment, process 500 uses the identification code received as part of the existing customer match to search for customer information in one or more databases maintained by the vendor. Alternatively or additionally, the process 500 may check any additional customer information that was transmitted to the vendor as part of the existing customer match. The information maintained by the vendor, the information received from the lead generation system, or some combination of these types of information may be used to perform other operations in the process 500.

In a block 520, the process 500 performs at least one calculation regarding the existing customer information. For example, in one embodiment, the process 500 takes into consideration existing terms of an existing customer relationship and calculates modified terms that are expected to induce the consumer to remain as a customer of the vendor while still allowing the vendor to make a profit. While it is preferable that the vendor be able to make a profit on the transaction, it is not required. A vendor may, for example, be willing to take a small loss (or even a larger loss in some cases) in order to retain the customer for expected future transactions that may be more lucrative.

In a block 525, the process 500 provides an offer to an existing customer. Advantageously, the offer may be provided in person or over the telephone by a representative of the vendor. Alternatively, the offer may be provided by e-mail, fax, web site, or some other means. In one embodiment, an initial message may be immediately displayed to the consumer, indicating that the vendor will contact the consumer, and the vendor may follow up later with a personal e-mail, phone call, visit, or other means of communication. Preferably, the vendor contacts the consumer as soon as possible to increase the chances of retaining the customer, but this is not required.

As with the process 400, the operations of the process 500 may be performed by software, hardware, or firmware components, or some combination of the foregoing. In one embodiment, the operations of the process 500 are performed by one or more general purpose computers (not illustrated) of a vendor that receives leads from a lead generation system such as the system 100.

None of the operations of blocks 505, 510, 515, 520, and 525 is a required operation, and the invention is not limited to a process that performs every one of the operations. In one embodiment, all of the operations of the illustrated process 500 are performed. However, other embodiments omit one, some, or all of the operations of the process 500. A skilled artisan will appreciate, in light of this disclosure, that any group of operations of the process 500 may be combined into unique and advantageous processes, and that the invention (as defined by the original or future claims) may encompass any such embodiments or variations.

As an alternative to searching the vendor customer information database 110 to determine if a consumer is an existing customer of one or more vendors, the system 100 may use information from a consumer's credit report, or other accessible financial information, to determine if the consumer is an existing customer of one or more vendors. In one embodiment, the system 100 gets a consumer's credit report, such as, for example, by requesting a credit report from a credit bureau. The system 100 may request the consumer's permission and ask for the consumer's Social Security Number or other identifying information before getting the credit report.

Much financial information, such as credit reports, includes sufficient information for identifying a consumer's vendors. For example, credit reports have sufficient information to identify a consumer's credit vendors. Typical credit report information includes heading information, personal information, employment information, report summary information, scorecard information, collections information, public records information, trade lines information, inquiry information, and message information.

Heading information may include the name and contact information of the credit bureau issuing the report and the date the report was issued.

Personal information may include a consumer's name, Social Security Number, date of birth, addresses, phone numbers, and the like.

Employment information may include the consumer's current and past employment history such as company name, date hired, income, occupation, separation date, and the like.

Report summary information may summarize the consumer's credit history such as total number of accounts, accounts that are still currently active or negative or too new to be rated, accounts that are past due or paid off, person(s) that have inquired upon the applicant's credit history, accounts that are in collections, total amount still owed, a breakdown of the amount owed, and the like.

Scorecard information may include a summary of the consumer's credit score and related information.

Collections information may include an identification of consumer accounts that have been transferred to a debt-collecting firm, the name of the collection agency, the collector's kind-of-business designators, the consumer's account number with the collection agency, and the like.

Public records information may include bankruptcies, liens, or civil actions against the consumer. Such information may include the reporting account's name and number, original filing date with court, status date if status is satisfied, released, vacated, discharged or dismissed, amount and type of public record, certificate or docket number, code describing the consumer's association to the public record item per the Equal Credit Opportunity Act, and the like.

Trade lines information may include information about loans and credit cards with payment histories, including name of creditor, credit amount information, payment history information, and the like.

Inquiry information may include a list of entities that have inquired about the consumer's credit.

Message information may include messages regarding the consumer's credit, Social Security Number, name, address, or other information.

In one embodiment, the system 100 gets an electronic credit report about a consumer in order to facilitate the process of determining the consumer's vendors from the credit report. Advantageously, electronic credit reports typically have uniform fields that an automated computer program can parse to extract vendor information. For example, trade lines information in Experian credit reports includes standard fields such as subscriber (i.e. a lender name), lender subcode (a code to uniquely identify each lender), consumer's account number, kind-of-business code, type of loan, term of a loan in months, type of account (such as individual, joint account, etc.), date the account was opened, date of the balance shown, date of last payment, various amounts (such as original loan amount, credit limit, highest balance, and charge-offs), account balance, monthly payment, date the account reached its current status, amount past due, account condition (open, closed, etc.), number of months of payment history on file, date the worst status was reached, payment status (including, for example, whether the account is in collections, current, or 30 days delinquent), and payment history by month (including statuses of current, current with a zero balance, 30 days past due, 60 days past due, paying under a wage earner plan ("WEP"), repossession or foreclosure, collection or charge-off, or in collection).

Any portion or all of the foregoing information may be extracted from the trade lines information and may be used by the system 100 to determine whether vendor criteria is met for the consumer. For example, the type of loan field may be used to determine if an existing account is an automobile loan or a revolving loan. Similarly, the kind-of-business code may be used to determine what kind of business the vendor is in, such as automotive, banking and savings and loan, clothing, department stores, retail, education, finance, groceries, home furnishings, insurance, jewelry, cameras, computers, contractors, lumber, building materials, hardware, medical and health care, credit card, travel, entertainment, oil companies, personal services, mail order houses, sporting goods, farm and garden supplies, utilities and fuel, government, wholesale, advertising, collection services, miscellaneous, or the like.

In one embodiment, the system 100 extracts vendor information, such as subscriber name or lender subcode, from the trade lines information of a credit report. The system 100 then determines, based on the extracted information, the consumer's existing vendors. The determination of existing vendors may be achieved, for example, by looking up a subscriber name or lender subcode in a database that uniquely associates each vendor with a subscriber name or lender subcode.

Figure 6:
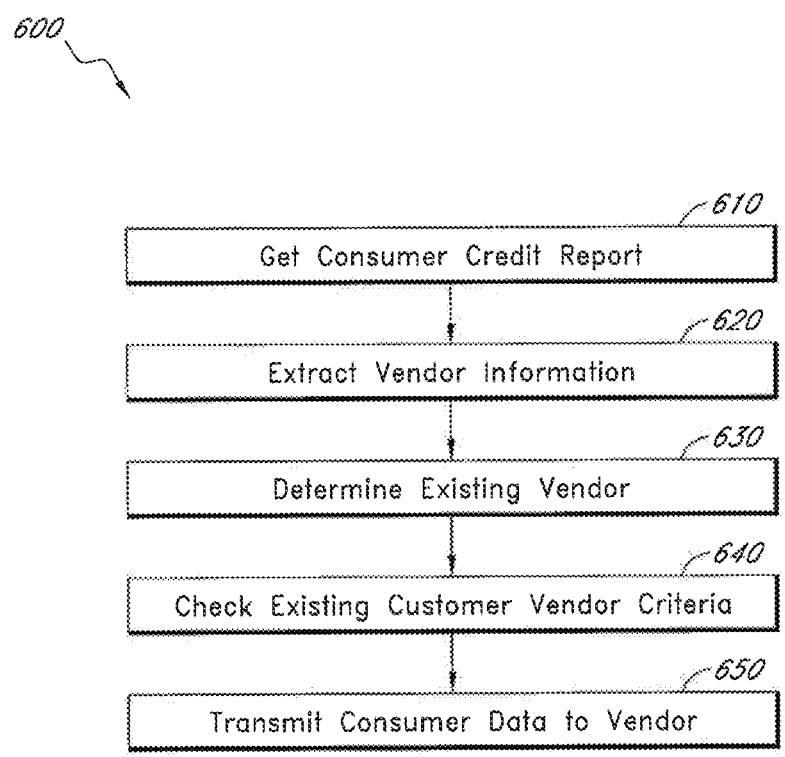
FIG. 6 is a flowchart that illustrates one process of generating and transmitting an existing customer lead.

In one embodiment, after determining an existing vendor of the consumer, the system 100 checks existing customer vendor criteria to determine if the consumer is a match with an existing vendor. If the consumer is a match for an existing vendor, the system 100 may generate and transmit consumer data, such as an existing consumer lead, to the vendor, FIG. 6 is a flowchart that illustrates one process of generating and transmitting an existing customer lead. A process 600 comprises a block 610 of getting a consumer's credit report, a block 620 of extracting vendor information, a block 630 of determining an existing vendor of the consumer, a block 640 of checking existing customer vendor criteria, and a block 650 of transmitting consumer data to the vendor.

In the block 610, the process 600 gets a consumer credit report. In one embodiment, the process 600 requests permission from the consumer to get the credit report. In one embodiment, the process 600 gets an electronic credit report from a credit bureau.

In the block 620, the process 600 extracts vendor information from the credit report. In one embodiment, the extraction of vendor information from the credit report includes using an automated process to parse the credit report and to locate fields that contain vendor information. In one embodiment, the vendor information uniquely identifies the vendor. In one embodiment, the vendor information comprises a code that uniquely identifies the vendor. In one embodiment, the process 600 extracts the vendor information from trade lines information contained within the credit report.

In the block 630, the process 600 determines an existing vendor of the consumer using the extracted vendor information. In one embodiment, the process 600 determines the existing vendor by using a database that associates the vendor information extracted from the credit report with a vendor. For example, if the extracted vendor information comprises a unique vendor identification code, the process 600 may use a database that includes the unique vendor identification code as a key to vendor records within the database.

In the block 640, the process 600 checks existing vendor criteria to determine if the consumer is a match for the vendor. In one embodiment, the existing vendor criteria includes criteria related to the type of product or service requested by the consumer. In one embodiment, the criteria includes criteria related to the income of the consumer. In one embodiment, the criteria includes criteria related to the credit-worthiness of the consumer. In one embodiment, the criteria includes criteria related to the existing type of account that the consumer has with the vendor. As will be appreciated by a skilled artisan, any other criteria that is disclosed in this application or is understood by a skilled artisan in view of this disclosure can be used in place of or in addition to these criteria. As described above with regard to other processes, the process 600 may optionally take into account, in determining whether a consumer is a match for the vendor, a bounty that each vendor will pay in order to receive a lead for the consumer.

In the block 650, the process 600 transmits consumer data to matched vendors. In one embodiment, the consumer data comprises a lead. The method of transmission may include any method of transmission disclosed herein or apparent to a skilled artisan in view of this disclosure.

The process 600 has been described by way of example and not limitation. A skilled artisan will appreciate that variations may be made. For example, while the process 600 may retrieve a credit report, as described, to determine whether the consumer is an existing customer of any vendors, other information may be used for this purpose. In one embodiment, any financial information that includes information about one or more of a consumer's vendors may be used.

A skilled artisan will appreciate, in light of this disclosure, that not all operations that were described with respect to the system 100, the process 400, or the process 500 have been described with respect to the process 600. This does not mean, however, that the operations described with respect to the system 100, the process 400, or the process 500 cannot be performed together with or in place of the operations described with respect to the process 600. Indeed, it will be understood by a skilled artisan that the process 600 is described to illustrate that the operations described throughout this disclosure, or appreciated in view of the disclosure, can be adapted to be used for alternative embodiments in which existing customers are identified using information from financial records such as credit reports rather than looked up in the vendor customer information database 110. As such, any of the operations described anywhere in this disclosure, or understood by a skilled artisan in view of this disclosure, can be performed as an alternative to or in addition to the operations described with respect to the process 600.

None of the operations of blocks 610, 620, 630, 640, and 650 is a required operation, and the invention is not limited to a process that performs every one of the operations. In one embodiment, all of the operations of the illustrated process 600 are performed. However, other embodiments omit one, some, or all of the operations of the process 600. A skilled artisan will appreciate, in light of this disclosure, that any group of operations of the process 600 may be combined into unique and advantageous processes, and that the invention (as defined by the original or future claims) may encompass any such embodiments or variations.

Neither the system 100, the process 400, the process 500, nor the process 600 requires checking for existing customers for every vendor that receives leads from the system 100. Some vendors may choose not to provide existing customer information with which to build or update the vendor customer information database 110. In addition, vendors are not required to send information about all of their existing customers to the system, and some vendors may choose to provide information about only some of their customers. Vendors may, but are not required, to participate in existing customer checking that does not involve receiving a vendor's customer list, such as, for example, the process 600 described herein. Advantageously, therefore, the vendor is able to control which customers are part of the existing customer checking process. Further, a lead generation company may choose to provide existing customer checking only for certain vendors, such as, for example, vendors that buy a large volume of leads from the lead generation company. Accordingly, while it is preferable to perform an existing customer checking process for every lead and every vendor, this is not required. Rather, the embodiments described herein can perform the existing customer checking process only for some vendors or only for some leads with respect to some vendors.

The components of the system 100 and the blocks of the process 400, the process 500, and the process 600, and any other components or processes set forth herein or apparent to a skilled artisan in light of this disclosure, can be embodied in computer-executable instructions stored on a computer-readable medium, such that the functions performed by the components or the processes are performed when the computer-executable instructions are executed by a general purpose computer. Alternatively, the components or processes may be embodied in hardware components, firmware components, or components that are some combination of hardware, firmware, and software, that perform the equivalent functions. A skilled artisan will understand that hardware, firmware, software, or combination embodiments are equivalent, and will understand how to make and use any of these embodiments.

We have described the foregoing embodiments by way of example and not limitation. A skilled artisan will appreciate, in light of this disclosure, that the invention is not limited to the disclosed embodiments, but encompasses the disclosed embodiments individually, combinations of features of the disclosed embodiments, and variations of the disclosed embodiments that are apparent to a skilled artisan in light of this disclosure. For example, a skilled artisan will appreciate that many of the features described herein can be modified or omitted from certain embodiments without departing from the invention.

We claim:

1. A system comprising:
one or more computer readable storage devices configured to store:
a plurality of computer-executable instructions;
vendor criteria that specifies, for each vendor, criteria for determining leads of interest to the vendor, including existing customer criteria and potential customer criteria;
a web server configured to receive user characteristics and characteristics of a product or service; and
one or more hardware computer processors in communication with the one or more computer readable storage devices to execute the plurality of computer-executable instructions to cause the system to:
automatically generate display instructions comprising a web-based form configured to be presented on a web page, the web-based form configured to prompt a user to input a first set of user characteristics associated with the user;
electronically receive a request to match the user with one or more vendors, wherein the request includes the first set of user characteristics;
electronically receive, from a third party server, a second set of user characteristics comprising user characteristics associated with the user;
transmit, to a vendor, at least a portion of both the first set of user characteristics and the second set of user characteristics, including enough information to determine whether the user is an existing customer of the vendor while maintaining security and privacy of the user's sensitive personal information due to the portion including not enough information to allow the vendor to directly contact the user;
receive, from the vendor, an indication of whether the user is an existing customer of the vendor;
if the user is an existing customer of the vendor:
based on a first comparison indicating a match to an existing customer, perform a first update to the web page to include the vendor, wherein the first comparison is based at least in part on the existing customer criteria and the first set of user characteristics; or
if the user is not an existing customer of the vendor:
based on a second comparison indicating a match to a potential customer, perform a second update to the web page to include the vendor, wherein the second comparison is based at least in part on the potential customer criteria and the first set of user characteristics; and
in response to receiving an indication of selection of the vendor by the user, transmit personally identifying user information associated with the user to the vendor.

2. The system of claim 1, wherein the second set of user characteristics is identified based at least in part on the first set of user characteristics.

3. The system of claim 1, wherein the first comparison is based on a determination that a close match to an existing customer is found, even if the match is not exact, wherein the second comparison is based on a determination that a close match to a potential customer is found, even if the match is not exact.

4. The system of claim 1, wherein the first set of user characteristics includes one or more of: a name, a zip code, an address, an income value and a credit rating value.

5. The system of claim 1, wherein the one or more hardware computer processors further cause the system to:
check bounties that vendors are willing to pay to receive a lead; and
select one or more vendors, including the vendor, based at least in part on the bounties.

6. A method comprising:
accessing a vendor criteria database comprising vendor criteria that specifies, for each vendor, criteria for determining leads of interest to the vendor, including existing customer criteria and potential customer criteria;
generating, display instruction comprising a web-based form configured to be presented on a web page, the web-based form configured to prompt a user to input a first set of user characteristics associated with the user;
electronically receiving, by a web server, a request to match the user with one or more vendors, wherein the request includes the first set of user characteristics;
electronically receiving, from a third party server, a second set of user characteristics comprising user characteristics associated with the user;
transmitting, to a vendor, at least a portion of both the first set of user characteristics and the second set of user characteristics, including enough information to determine whether the user is an existing customer of the vendor while maintaining security and privacy of the user's sensitive personal information due to the portion including not enough information to allow the vendor to directly contact the user;
receiving, from the vendor, an indication of whether the user is an existing customer of the vendor;
if the user is an existing customer of the vendor:
based on a first comparison indicating a match to an existing customer, perform a first update to the web page to include the vendor, wherein the first comparison is based at least in part on the existing customer criteria and the first set of user characteristics; or
if the user is not an existing customer of the vendor:
based on a second comparison indicating a match to a potential customer, perform a second update to the web page to include the vendor, wherein the second comparison is based at least in part on the potential customer criteria and the first set of user characteristics; and
in response to receiving an indication of selection of the vendor by the user, transmitting personally identifying user information associated with the user to the vendor.

7. The method of claim 6, wherein the second set of user characteristics is identified based at least in part on the first set of user characteristics.

8. The method of claim 6, wherein the first comparison is based on a determination that a close match to an existing customer is found, even if the match is not exact, wherein the second comparison is based on a determination that a close match to a potential customer is found, even if the match is not exact.

9. The method of claim 6, wherein the first set of user characteristics includes one or more of: a name, a zip code, an address, an income value and a credit rating value.

10. The method of claim 6, further comprising:
- check bounties that vendors are willing to pay to receive a lead; and
- select one or more vendors, including the vendor, based at least in part on the bounties.

11. Non-transitory computer storage having stored thereon a computer program, the computer program including executable instructions that instruct a computer system to at least:
- access a vendor criteria database comprising vendor criteria that specifies, for each vendor, criteria for determining leads of interest to the vendor, including existing customer criteria and potential customer criteria;
- generate, display instruction comprising a web-based form configured to be presented on a web page, the web-based form configured to prompt a user to input a first set of user characteristics associated with the user;
- electronically receive, by a web server, a request to match the user with one or more vendors, wherein the request includes the first set of user characteristics;
- electronically receive, from a third party server, a second set of user characteristics comprising user characteristics associated with the user;
- transmit, to a vendor, at least a portion of both the first set of user characteristics and the second set of user characteristics, including enough information to determine whether the user is an existing customer of the vendor while maintaining security and privacy of the user's sensitive personal information due to the portion of including not enough information to allow the vendor to directly contact the user;
- receive, from the vendor, an indication of whether the user is an existing customer of the vendor;
- if the user is an existing customer of the vendor:
  - based on a first comparison indicating a match to an existing customer, perform a first update to the web page to include the vendor, wherein the first comparison is based at least in part on the existing customer criteria and the first set of user characteristics; or
- if the user is not an existing customer of the vendor:
  - based on a second comparison indicating a match to a potential customer, perform a second update to the web page to include the vendor, wherein the second comparison is based at least in part on the potential customer criteria and the first set of user characteristics; and
- in response to receiving an indication of selection of the vendor by the user, transmit personally identifying user information associated with the user to the vendor.

12. The non-transitory computer storage of claim 11, wherein the second set of user characteristics is identified based at least in part on the first set of user characteristics.

13. The system of claim 4, wherein the portion of the first set of user characteristics includes a subset of data included in the first set of user characteristics including one or more of: a portion of a user's first name, a portion of a user's last name, a portion of a user's zip code, and a portion of a user's address.

14. The system of claim 1, wherein the one or more hardware computer processors are configured to further cause the system to:
- transmit, to the vendor, in addition to the portion of the first set of user characteristics, additional information related to a type of good of service being offered.

15. The system of claim 1, wherein the first set of user characteristics are received from a remote terminal associated with the user.

16. The system of claim 15, wherein the third party server is at a physical location that is remote from the remote terminal associated with the user.

17. The system of claim 16, wherein the vendor is at a physical location that is remote from the physical location associated with the third party server and the remote terminal associated with the user.

18. The system of claim 1, wherein the at least a portion of the first set of user characteristics comprises a match key, wherein the match key provides a unique identification of the user with a high degree of accuracy.

19. The system of claim 1, wherein the second set of user characteristics is received by using one or more of: File Transfer Protocol, Extensible Markup Language, Open Database Connectivity, or Hypertext Transfer Protocol.

20. The system of claim 1, wherein the second set of user characteristics is encrypted once received from the third party server to protect sensitive user information.

* * * * *